US012596794B2

(12) United States Patent
Tiwari et al.

(10) Patent No.: US 12,596,794 B2
(45) Date of Patent: Apr. 7, 2026

(54) SYSTEMS AND METHODS FOR ADAPTIVE ACTION WITH DISTRIBUTED ENFORCEMENT POINTS

(71) Applicant: Citrix Systems, Inc., Fort Lauderdale, FL (US)

(72) Inventors: Satyendra Tiwari, San Jose, CA (US); Paraskevas Zafiris, Patras (GR); Panagiotis Alexandros Pediaditis, Patras (GR)

( * ) Notice: Subject to any disclaimer, the term of this patent is extended or adjusted under 35 U.S.C. 154(b) by 0 days.

(21) Appl. No.: 17/582,660

(22) PCT Filed: Dec. 22, 2021

(86) PCT No.: PCT/GR2021/000079
§ 371 (c)(1),
(2) Date: Jan. 24, 2022

(87) PCT Pub. No.: WO2023/118907
PCT Pub. Date: Jun. 29, 2023

(65) Prior Publication Data
US 2024/0330441 A1     Oct. 3, 2024

(51) Int. Cl.
*G06F 21/55* (2013.01)

(52) U.S. Cl.
CPC ...... *G06F 21/554* (2013.01); *G06F 2221/034* (2013.01)

(58) Field of Classification Search
CPC ............. G06F 21/554; G06F 2221/034; H04L 63/1408; H04L 63/1441
USPC ........................................................ 726/23
See application file for complete search history.

(56) References Cited

U.S. PATENT DOCUMENTS

| | | | |
|---|---|---|---|
| 2013/0074143 A1 | 3/2013 | Bu et al. | |
| 2020/0220875 A1* | 7/2020 | Harguindeguy | ...... H04L 63/101 |
| 2022/0036208 A1* | 2/2022 | Rao | ........................ H04L 63/145 |

FOREIGN PATENT DOCUMENTS

| | | |
|---|---|---|
| EP | 2 892 199 A1 | 7/2015 |
| EP | 3 678 348 A1 | 7/2020 |

OTHER PUBLICATIONS

International Search Report and Written Opinion for PCT Appl. No. PCT/GR21/000079, mailed Aug. 8, 2022.

* cited by examiner

*Primary Examiner* — Philip C Lee

(57) ABSTRACT

Described embodiments provide systems and methods for performing actions based on data of devices. A controller executing on at least one server may receive a first dataset from a first agent of a first device intermediary between a first plurality of client devices and a first plurality of servers. The first dataset may comprise a subset of data tracked at the first device and available to the first agent. The controller may receive a second dataset from a second agent of a second device intermediary between a second plurality of client devices and a second plurality of servers. The second dataset may comprise a subset of data tracked at the second device and available to the second agent. According to the first dataset and the second dataset, the controller may send an instruction to at least one of the first device, the second device or a third device.

18 Claims, 10 Drawing Sheets

User

+ userId:int
+ userName:string
- orgId:string

+ sendNotification():int
- notificationTemplate()
- notificationPreference()

---

ActionHandler 316

+ actionHandlerId:int
+ actionHandlerName:string
- actionHandlerType:string

+ createActionHandler():int
- performAction(actionId)

---

Device

+ deviceId:int
+ deviceIP:string
- deviceToken:string

+ getDevice():int
- performAction()
- save()

---

<<interface>>
ActionService

+ createAction():int
+ performAction():int
- clearAction(actionId)

---

Action policy 314

+ listenerId:int
+ listenerName:string
+ listenerType:string

+ getAction():int
- handleAction(actionId)

---

Data processing 312

+ eventId:int = defaultValue
+ eventName:string
- eventType:string

+ createEvent(entityName, entityValue):int
- deleteEvent(actionId)
- updateEvent(actionId)

---

EventCriteria

+ criteriaId:int
+ criteriaName:string
- criteriaType:string

+ getAttributes():int
- defineThreshold(actionId)
- setFlag()

700

710 Receive first dataset

712 Receive second dataset

714 Determine instruction by using datasets

716 Send instruction according to datasets

SYSTEMS AND METHODS FOR ADAPTIVE ACTION WITH DISTRIBUTED ENFORCEMENT POINTS

CROSS-REFERENCE TO RELATED APPLICATION

This application is a continuation of and claims priority to International Application No. PCT/GR2021/000079, titled "SYSTEMS AND METHODS FOR ADAPTIVE ACTION WITH DISTRIBUTED ENFORCEMENT POINTS," and filed on Dec. 22, 2021, the contents of all of which are hereby incorporated herein by reference in its entirety for all purposes.

FIELD OF THE DISCLOSURE

The present application generally relates to systems and methods for protecting network environments, including but not limited to systems and methods for identifying potential threats and/or performing corrective actions in a distributed manner.

BACKGROUND

In current applications, approaches for detecting or addressing potential security threats in a system are action-oriented. In one example, a corrective measure can address a potential security threat to the system. Approaches for detecting or addressing potential security threats can be closed-loop processes, in which the corrective measure is determined or performed in a centralized manner. In some cases, the corrective measure is determined or applied by using a manual approach, following an analysis of collected data.

SUMMARY

This Summary is provided to introduce a selection of concepts in a simplified form that are further described below in the Detailed Description. This Summary is not intended to identify key features or essential features, nor is it intended to limit the scope of the claims included herewith.

The present disclosure is directed towards systems and methods for detecting potential security threats and/or performing corrective actions in a distributed manner (rather than a centralized manner). In some embodiments, said systems and methods can be used to detect/address/manage/diagnose/remediate performance issues (e.g., performance issues of a server and/or other components) security issues, anomalies and/or configuration/misconfiguration issues. In one example, the novel approach may include monitoring and/or analyzing data (e.g., metrics, information of a counter, information of events, and/or other types of data) that is tracked and/or collected at a plurality of devices (e.g., a plurality of application delivery controllers (ADCs)). A controller of a server may determine, based on the tracked data, one or more instructions to perform and/or initiate at least one corrective action. Responsive to receiving the corresponding instruction(s), each device from the plurality of devices can perform at least one action to mitigate and/or address the potential security threat. The action(s) performed by each device may be different and/or distinct from each other (e.g., based on the data collected at each device).

In one aspect, the present disclosure is directed to a method for sending and/or configuring instructions to perform actions based on (or according to) data tracked at a plurality of devices. The method can include receiving, by a controller executing on at least one server, a first dataset from a first agent of a first device. The first device may be intermediary between a first plurality of client devices and a first plurality of servers. The first dataset may comprise a subset of data tracked at the first device and available to the first agent. The controller may receive a second dataset from a second agent of a second device. The second device may be intermediary between a second plurality of client devices and a second plurality of servers. The second dataset may comprise a subset of data tracked at the second device and available to the second agent. According to the first dataset and the second dataset, the controller may send an instruction to at least one of the first device, the second device or a third device In certain embodiments, the first dataset may comprise metrics of traffic or transactions between the first plurality of client devices and the first plurality of servers. In some embodiments, the first dataset may comprise information or events logged at the first device. In certain embodiments, the first dataset may comprise the subset of the data tracked at the first device, that is determined by the first agent according to a criteria (e.g., a set of criteria or a criterion), to send to the controller. In some embodiments, the instruction may initiate a first action on the first device. The first action may be separate from or in addition to a second action initiated by the first agent on the first device according to the data tracked at the first device.

In certain embodiments, the controller may determine the instruction by using a portion of the first dataset and the second dataset that correspond to a specific segment of devices or applications. In some embodiments, the third device may correspond to the specific segment of devices or applications. The third device can be intermediary between a third plurality of client devices and a third plurality of servers. In certain embodiments, the controller may receive the first dataset and the second dataset over a defined time duration. The controller may store the first dataset and the second dataset. In some embodiments, the controller may determine the instruction using the stored first dataset and the stored second dataset. In certain embodiments, the controller may perform machine or statistical learning using the first dataset and the second dataset. According to the machine or statistical learning, the controller may send a criteria (e.g., a set of criteria or a criterion) or an update to the first agent to control sending of an additional dataset of the first device to the controller.

In one aspect, the present disclosure is directed to a system comprising at least one processor and a transceiver. The at least one processor and the transceiver may be configured to receive a first dataset from a first agent of a first device. The first device may be intermediary between a first plurality of client devices and a first plurality of servers. The first dataset may comprise a subset of data tracked at the first device and available to the first agent. The at least one processor and the transceiver may be configured to receive a second dataset from a second agent of a second device. The second device may be intermediary between a second plurality of client devices and a second plurality of servers. The second dataset may comprise a subset of data tracked at the second device and available to the second agent. According to the first dataset and the second dataset, the at least one processor and the transceiver may be configured to send an instruction to at least one of the first device, the second device or a third device.

In certain embodiments, the first dataset may comprise metrics of traffic or transactions between the first plurality of client devices and the first plurality of servers. In some embodiments, the first dataset may comprise information or events logged at the first device. In certain embodiments, the first dataset may comprise the subset of the data tracked at the first device, that is determined by the first agent according to a criteria, to send to the controller. In some embodiments, the instruction may initiate a first action on the first device. The first action may be separate from or in addition to a second action initiated by the first agent on the first device according to the data tracked at the first device.

In certain embodiments, the at least one processor can be further configured to determine the instruction by using a portion of the first dataset and the second dataset that corresponds to a specific segment of devices or applications. In some embodiments, the third device may correspond to the specific segment of devices or applications. The third device may be intermediary between a third plurality of client devices and a third plurality of servers. In certain embodiments, the at least one processor may be further configured to receive, via the transceiver, the first dataset and the second dataset over a defined time duration. The at least one processor may be further configured to store the first dataset and the second dataset. The at least one processor may be further configured to determine the instruction using the stored first dataset and the stored second dataset. In some embodiments, the at least one processor can be further configured to perform machine or statistical learning using the first dataset and the second dataset. The at least one processor can be further configured to send, via the transceiver according to the machine or statistical learning, a criteria or an update to the first agent to control sending of an additional dataset of the first device to the system.

In one aspect, the present disclosure is directed to a non-transitory computer-readable medium storing instructions. The instructions stored in a non-transitory computer readable medium may cause at least one processor to receive via a transceiver, a first dataset from a first agent of a first device. The first device may be intermediary between a first plurality of client devices and a first plurality of servers. The first dataset may comprise a subset of data tracked at the first device and available to the first agent. The instructions may cause the at least one processor to receive, via the transceiver, a second dataset from a second agent of a second device. The second device may be intermediary between a second plurality of client devices and a second plurality of servers. The second dataset may comprise a subset of data tracked at the second device and available to the second agent. The instructions may cause the at least one processor to send, via the transceiver according to the first dataset and the second dataset, an instruction to at least one of the first device, the second device or a third device.

BRIEF DESCRIPTION OF THE DRAWING FIGURES

Objects, aspects, features, and advantages of embodiments disclosed herein will become more fully apparent from the following detailed description, the appended claims, and the accompanying drawing figures in which like reference numerals identify similar or identical elements. Reference numerals that are introduced in the specification in association with a drawing figure may be repeated in one or more subsequent figures without additional description in the specification in order to provide context for other features, and not every element may be labeled in every figure.

The drawing figures are not necessarily to scale, emphasis instead being placed upon illustrating embodiments, principles and concepts. The drawings are not intended to limit the scope of the claims included herewith.

FIG. 5 is a flow diagram of an example process for sending and/or configuring instructions to perform corrective actions, in accordance with an illustrative embodiment;

DETAILED DESCRIPTION

Figure 1A:
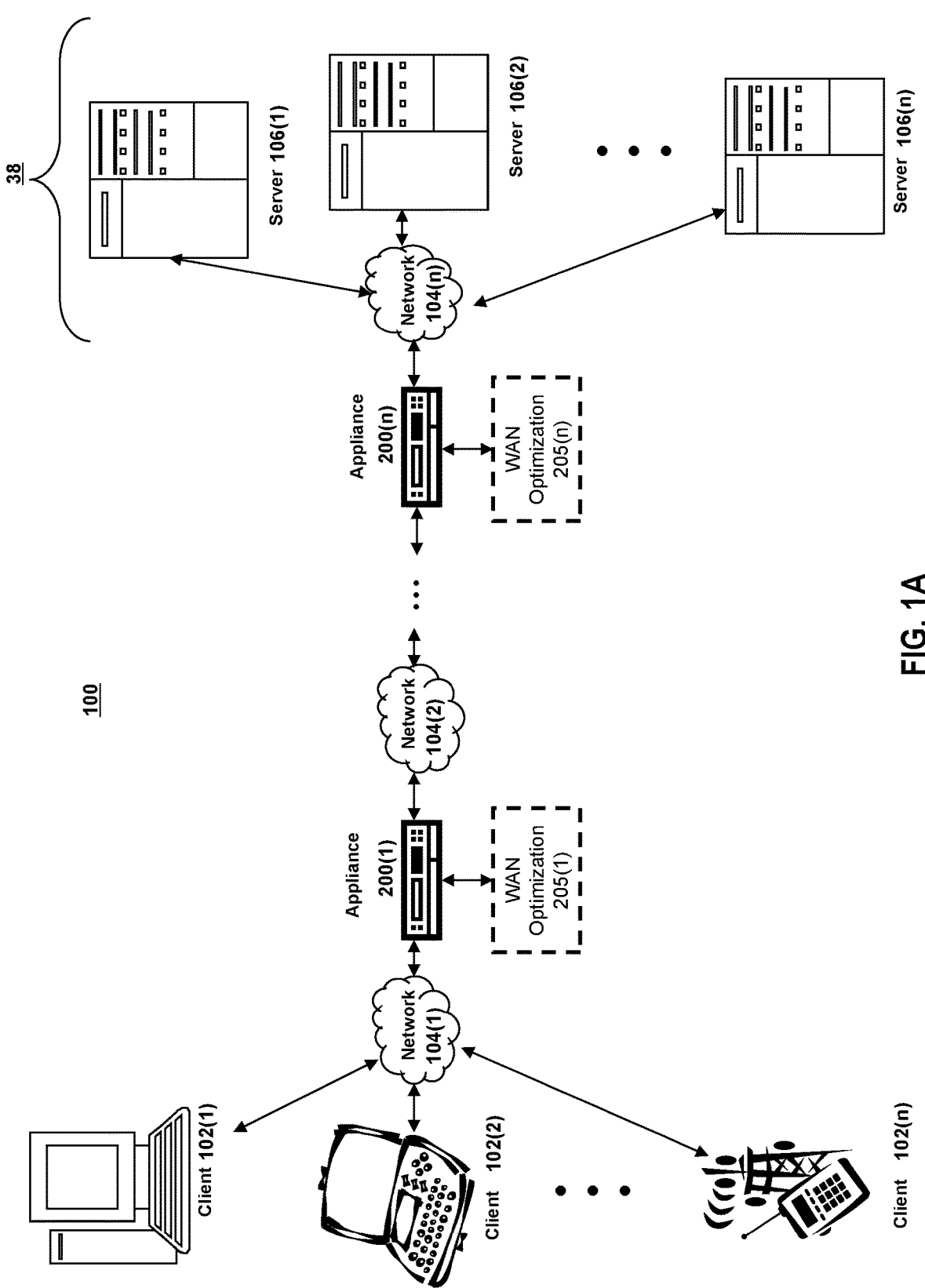
FIG. 1A is a block diagram of a network computing system, in accordance with an illustrative embodiment.

In certain scenarios, approaches for detecting, preventing and/or addressing potential security threats (e.g., cybersecurity breaches) in a system can be action-oriented. In one example, data may be collected from a plurality of sources (e.g., network appliances), wherein the data is processed and/or analyzed to determine and/or suggest a corrective action (e.g., to address and/or mitigate a potential threat to the system). The corrective action may include or correspond to a notification and/or alert for a user of a client device, for instance (e.g., a notification indicating that a potential threat has been detected, and/or suggesting the user perform the corrective action). In some cases, the approaches for detecting, preventing and/or addressing potential security threats may include or correspond to closed-loop processes, in which the data collection/processing and/or threat mitigation (e.g., determining and/or suggesting the corrective action) can be performed in a centralized manner (instead of in a distributed manner). Furthermore, and in some examples, the corrective action can be determined and/or applied by using a manual approach (e.g., manually determined/applied by an administrator and/or user of the system), following an analysis of the collected data (e.g., a manual analysis performed by the user and/or administrator of the system).

In one example, a corrective action for addressing performance issues of a server for instance, may include or correspond to an un-binding (e.g., removing and/or terminating a connection) of said server (e.g., a backend server). For example, the server can be un-bound based on an identification and/or detection of an anomalous response time (e.g., latency) associated with the server. The identification/detection of the anomalous response time may occur following a pre-determined interval and/or period of time, in which a plurality of response time values (e.g., associated with the server and/or with other servers) are measured and/or collected. For example, a first server may be un-bound if a response time of the first server is significantly larger that a plurality of response time values/measurements associated with other servers (e.g., collected/measured over a pre-determined time interval). As such, the corrective action (e.g., un-binding the first server) can be applied and/or performed after (or following) the pre-determined interval of time lapses, rather than within a shorter time period.

In one example, a corrective action for addressing mis-configuration issues can be applied and/or performed responsive to detecting and/or identifying a misconfigura-tion, such as a mismatch (e.g., different configurations between ports) of a virtual local area network (VLAN), an improper type of persistence, a persistence limit, a build-up of a secure sockets layer (SSL) session, and/or other types of misconfigurations. In certain scenarios, the type of cor-rective action to be applied can be determined based on (or according to) a type of attack, breach, threat and/or risk (e.g., a small window attack, a Hypertext Transfer Protocol (HTTP) large request/response header, an increase in mal-formed internet protocol (IP) packets, and/or other types of attacks). Default values for identifying and/or detecting the type of attack may be pre-configured (e.g., configured in a user profile). The default values can be adjusted and/or modified according to (or based on) a type of application.

In accordance with the above description, at least one limitation of closed-loop approaches (e.g., approaches in which data collection and/or corrective actions are per-formed in a centralized manner) can include defining and/or performing corrective actions for each particular threat. The process of defining and/or performing corrective actions may be time-consuming, even more so if said processes are applied to each particular threat. Moreover, and in some examples, closed-loop processes may require manual con-figuration of parameters and/or thresholds for identifying/ detecting threats, which can introduce errors in the detection of said threats. Furthermore, defining and/or configuring said parameters/thresholds (e.g., for identifying/detecting threats) can be time-consuming. For example, a system administrator (or other entities) may be unable to define the parameters/thresholds until sufficient data is collected and/or observed, wherein the data collection takes place over a period of time. As such, the system administrator is able to determine and/or define the parameters/thresholds after the period of time lapses, thereby introducing a time constraint (e.g., defined by the period of time) for determining the parameters/thresholds. Moreover, closed-loop (e.g., central-ized) approaches may be unsuitable for distributed systems, given that configured thresholds and/or corrective actions for a first scenario may be unable to be generalized to a second scenario, for instance.

The systems and methods presented herein include a novel approach for detecting/identifying/monitoring poten-tial security threats and/or determining/performing correc-tive actions in a distributed manner (rather than a centralized manner). In some embodiments, the novel approach can be used to detect/address/manage performance issues of a com-ponent of a system (e.g., a backend server), detect a feature/ configuration/anomaly, and/or to diagnose, troubleshoot and/or remediate configuration/misconfiguration issues (e.g. perform steps to analyze, triage and/or optimize/remediate configuration/misconfiguration issues). For instance, the novel approach may include monitoring and/or analyzing data (e.g., metrics, information of a counter, information of events, and/or other types of data) that is tracked and/or collected at a plurality of devices (e.g., a plurality of application delivery controllers (ADCs)). A controller of a server may determine, based on the tracked data, one or more instructions to perform and/or to initiate at least one corrective action. Responsive to receiving the corresponding instruction(s), each device from the plurality of devices can perform at least one action to mitigate and/or address the potential security threat. The action(s) performed by each device may be different and/or distinct from each other (e.g., based on the data collected at each device).

For purposes of reading the description of the various embodiments below, the following descriptions of the sec-tions of the specification and their respective contents may be helpful:

Section A describes a network environment and comput-ing environment which may be useful for practicing embodiments described herein;

Section B describes embodiments of systems and meth-ods for delivering a computing environment to a remote user;

Section C describes embodiments of systems and meth-ods for detecting potential security threats and/or per-forming corrective actions.

A. Network and Computing Environment

Referring to FIG. 1A, an illustrative network environment 100 is depicted. Network environment 100 may include one or more clients 102(1)-102(n) (also generally referred to as local machine(s) 102 or client(s) 102) in communication with one or more servers 106(1)-106(n) (also generally referred to as remote machine(s) 106 or server(s) 106) via one or more networks 104(1)-104n (generally referred to as network(s) 104). In some embodiments, a client 102 may communicate with a server 106 via one or more appliances 200(1)-200n (generally referred to as appliance(s) 200 or gateway(s) 200).

Although the embodiment shown in FIG. 1A shows one or more networks 104 between clients 102 and servers 106, in other embodiments, clients 102 and servers 106 may be on the same network 104. The various networks 104 may be the same type of network or different types of networks. For example, in some embodiments, network 104(1) may be a private network such as a local area network (LAN) or a company Intranet, while network 104(2) and/or network 104(n) may be a public network, such as a wide area network (WAN) or the Internet. In other embodiments, both network 104(1) and network 104(n) may be private networks. Net-works 104 may employ one or more types of physical networks and/or network topologies, such as wired and/or wireless networks, and may employ one or more commu-nication transport protocols, such as transmission control protocol (TCP), internet protocol (IP), user datagram pro-tocol (UDP) or other similar protocols.

As shown in FIG. 1A, one or more appliances 200 may be located at various points or in various communication paths of network environment 100. For example, appliance 200 may be deployed between two networks 104(1) and 104(2), and appliances 200 may communicate with one another to work in conjunction to, for example, accelerate network traffic between clients 102 and servers 106. In other embodi-ments, the appliance 200 may be located on a network 104. For example, appliance 200 may be implemented as part of one of clients 102 and/or servers 106. In an embodiment, appliance 200 may be implemented as a network device such as Citrix networking (formerly NetScaler®) products sold by Citrix Systems, Inc. of Fort Lauderdale, FL.

As shown in FIG. 1A, one or more servers 106 may operate as a server farm 38. Servers 106 of server farm 38 may be logically grouped, and may either be geographically co-located (e.g., on premises) or geographically dispersed (e.g., cloud based) from clients 102 and/or other servers 106. In an embodiment, server farm 38 executes one or more applications on behalf of one or more of clients 102 (e.g., as an application server), although other uses are possible, such as a file server, gateway server, proxy server, or other similar server uses. Clients 102 may seek access to hosted applications on servers 106.

As shown in FIG. 1A, in some embodiments, appliances 200 may include, be replaced by, or be in communication with, one or more additional appliances, such as WAN optimization appliances 205(1)-205(n), referred to generally as WAN optimization appliance(s) 205. For example, WAN optimization appliance 205 may accelerate, cache, compress or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS). In some embodiments, appliance 205 may be a performance enhancing proxy or a WAN optimization controller. In one embodiment, appliance 205 may be implemented as Citrix SD-WAN products sold by Citrix Systems, Inc. of Fort Lauderdale, FL.

Figure 1B:
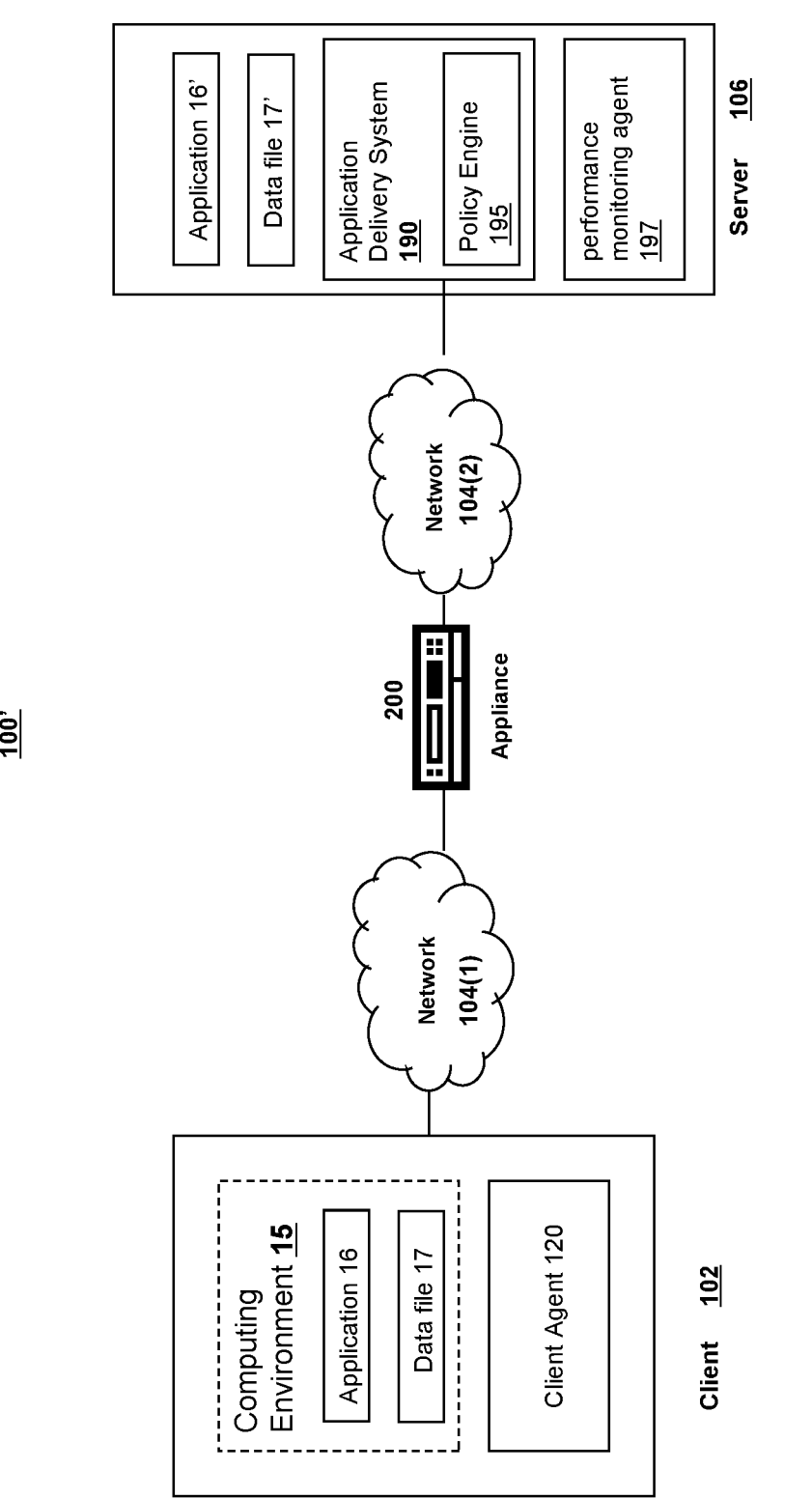
FIG. 1B is a block diagram of a network computing system for delivering a computing environment from a server to a client via an appliance, in accordance with an illustrative embodiment.

Referring to FIG. 1B, an example network environment, 100', for delivering and/or operating a computing network environment on a client 102 is shown. As shown in FIG. 1B, a server 106 may include an application delivery system 190 for delivering a computing environment, application, and/or data files to one or more clients 102. Client 102 may include client agent 120 and computing environment 15. Computing environment 15 may execute or operate an application, 16, that accesses, processes or uses a data file 17. Computing environment 15, application 16 and/or data file 17 may be delivered via appliance 200 and/or the server 106.

Appliance 200 may accelerate delivery of all or a portion of computing environment 15 to a client 102, for example by the application delivery system 190. For example, appliance 200 may accelerate delivery of a streaming application and data file processable by the application from a data center to a remote user location by accelerating transport layer traffic between a client 102 and a server 106. Such acceleration may be provided by one or more techniques, such as: 1) transport layer connection pooling, 2) transport layer connection multiplexing, 3) transport control protocol buffering, 4) compression, 5) caching, or other techniques. Appliance 200 may also provide load balancing of servers 106 to process requests from clients 102, act as a proxy or access server to provide access to the one or more servers 106, provide security and/or act as a firewall between a client 102 and a server 106, provide Domain Name Service (DNS) resolution, provide one or more virtual servers or virtual internet protocol servers, and/or provide a secure virtual private network (VPN) connection from a client 102 to a server 106, such as a secure socket layer (SSL) VPN connection and/or provide encryption and decryption operations.

Application delivery management system 190 may deliver computing environment 15 to a user (e.g., client 102), remote or otherwise, based on authentication and authorization policies applied by policy engine 195. A remote user may obtain a computing environment and access to server stored applications and data files from any network-connected device (e.g., client 102). For example, appliance 200 may request an application and data file from server 106. In response to the request, application delivery system 190 and/or server 106 may deliver the application and data file to client 102, for example via an application stream to operate in computing environment 15 on client 102, or via a remote-display protocol or otherwise via remote-based or server-based computing. In an embodiment, application delivery system 190 may be implemented as any portion of the Citrix Workspace Suite™ by Citrix Systems, Inc., such as Citrix Virtual Apps and Desktops (formerly XenApp® and XenDesktop®).

Policy engine 195 may control and manage the access to, and execution and delivery of, applications. For example, policy engine 195 may determine the one or more applications a user or client 102 may access and/or how the application should be delivered to the user or client 102, such as a server-based computing, streaming or delivering the application locally to the client 120 for local execution.

For example, in operation, a client 102 may request execution of an application (e.g., application 16') and application delivery system 190 of server 106 determines how to execute application 16', for example based upon credentials received from client 102 and a user policy applied by policy engine 195 associated with the credentials. For example, application delivery system 190 may enable client 102 to receive application-output data generated by execution of the application on a server 106, may enable client 102 to execute the application locally after receiving the application from server 106, or may stream the application via network 104 to client 102. For example, in some embodiments, the application may be a server-based or a remote-based application executed on server 106 on behalf of client 102. Server 106 may display output to client 102 using a thin-client or remote-display protocol, such as the Independent Computing Architecture (ICA) protocol by Citrix Systems, Inc. of Fort Lauderdale, FL. The application may be any application related to real-time data communications, such as applications for streaming graphics, streaming video and/or audio or other data, delivery of remote desktops or workspaces or hosted services or applications, for example infrastructure as a service (IaaS), desktop as a service (DaaS), workspace as a service (WaaS), software as a service (SaaS) or platform as a service (PaaS).

One or more of servers 106 may include a performance monitoring service or agent 197. In some embodiments, a dedicated one or more servers 106 may be employed to perform performance monitoring. Performance monitoring may be performed using data collection, aggregation, analysis, management and reporting, for example by software, hardware or a combination thereof. Performance monitoring may include one or more agents for performing monitoring, measurement and data collection activities on clients 102 (e.g., client agent 120), servers 106 (e.g., agent 197) or an appliance 200 and/or 205 (agent not shown). In general, monitoring agents (e.g., 120 and/or 197) execute transparently (e.g., in the background) to any application and/or user of the device. In some embodiments, monitoring agent 197 includes any of the product embodiments referred to as Citrix Analytics or Citrix Application Delivery Management by Citrix Systems, Inc. of Fort Lauderdale, FL.

The monitoring agents 120 and 197 may monitor, measure, collect, and/or analyze data on a predetermined frequency, based upon an occurrence of given event(s), or in real time during operation of network environment 100. The monitoring agents may monitor resource consumption and/ or performance of hardware, software, and/or communications resources of clients 102, networks 104, appliances 200 and/or 205, and/or servers 106. For example, network connections such as a transport layer connection, network latency, bandwidth utilization, end-user response times, application usage and performance, session connections to an application, cache usage, memory usage, processor usage, storage usage, database transactions, client and/or server utilization, active users, duration of user activity, application crashes, errors, or hangs, the time required to log-in to an application, a server, or the application delivery system, and/or other performance conditions and metrics may be monitored.

The monitoring agents 120 and 197 may provide application performance management for application delivery system 190. For example, based upon one or more monitored performance conditions or metrics, application delivery system 190 may be dynamically adjusted, for example periodically or in real-time, to optimize application delivery by servers 106 to clients 102 based upon network environment performance and conditions.

In described embodiments, clients 102, servers 106, and appliances 200 and 205 may be deployed as and/or executed on any type and form of computing device, such as any desktop computer, laptop computer, or mobile device capable of communication over at least one network and performing the operations described herein. For example, clients 102, servers 106 and/or appliances 200 and 205 may each correspond to one computer, a plurality of computers, or a network of distributed computers such as computer 101 shown in FIG. 1C.

Figure 1C:
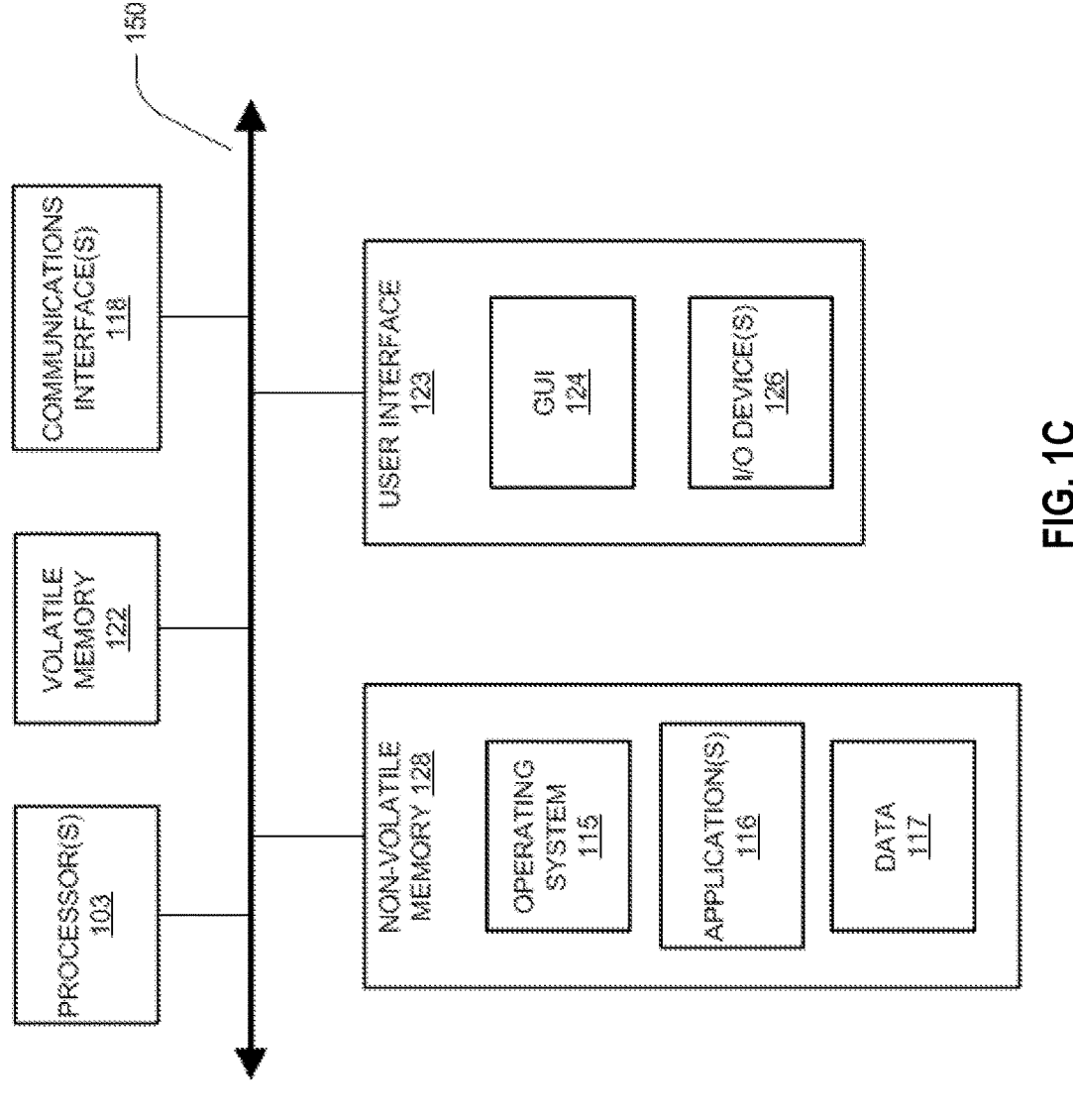
FIG. 1C is a block diagram of a computing device, in accordance with an illustrative embodiment.

As shown in FIG. 1C, computer 101 may include one or more processors 103, volatile memory 122 (e.g., RAM), non-volatile memory 128 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 123, one or more communications interfaces 118, and communication bus 150. User interface 123 may include graphical user interface (GUI) 124 (e.g., a touchscreen, a display, etc.) and one or more input/output (I/O) devices 126 (e.g., a mouse, a keyboard, etc.). Non-volatile memory 128 stores operating system 115, one or more applications 116, and data 117 such that, for example, computer instructions of operating system 115 and/or applications 116 are executed by processor(s) 103 out of volatile memory 122. Data may be entered using an input device of GUI 124 or received from I/O device(s) 126. Various elements of computer 101 may communicate via communication bus 150. Computer 101 as shown in FIG. 1C is shown merely as an example, as clients 102, servers 106 and/or appliances 200 and 205 may be implemented by any computing or processing environment and with any type of machine or set of machines that may have suitable hardware and/or software capable of operating as described herein.

Processor(s) 103 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

Communications interfaces 118 may include one or more interfaces to enable computer 101 to access a computer network such as a LAN, a WAN, or the Internet through a variety of wired and/or wireless or cellular connections.

In described embodiments, a first computing device 101 may execute an application on behalf of a user of a client computing device (e.g., a client 102), may execute a virtual machine, which provides an execution session within which applications execute on behalf of a user or a client computing device (e.g., a client 102), such as a hosted desktop session, may execute a terminal services session to provide a hosted desktop environment, or may provide access to a computing environment including one or more of: one or more applications, one or more desktop applications, and one or more desktop sessions in which one or more applications may execute.

Additional details of the implementation and operation of network environment 100, clients 102, servers 106, and appliances 200 and 205 may be as described in U.S. Pat. No. 9,538,345, issued Jan. 3, 2017 to Citrix Systems, Inc. of Fort Lauderdale, FL, the teachings of which are hereby incorporated herein by reference.

Figure 1D:
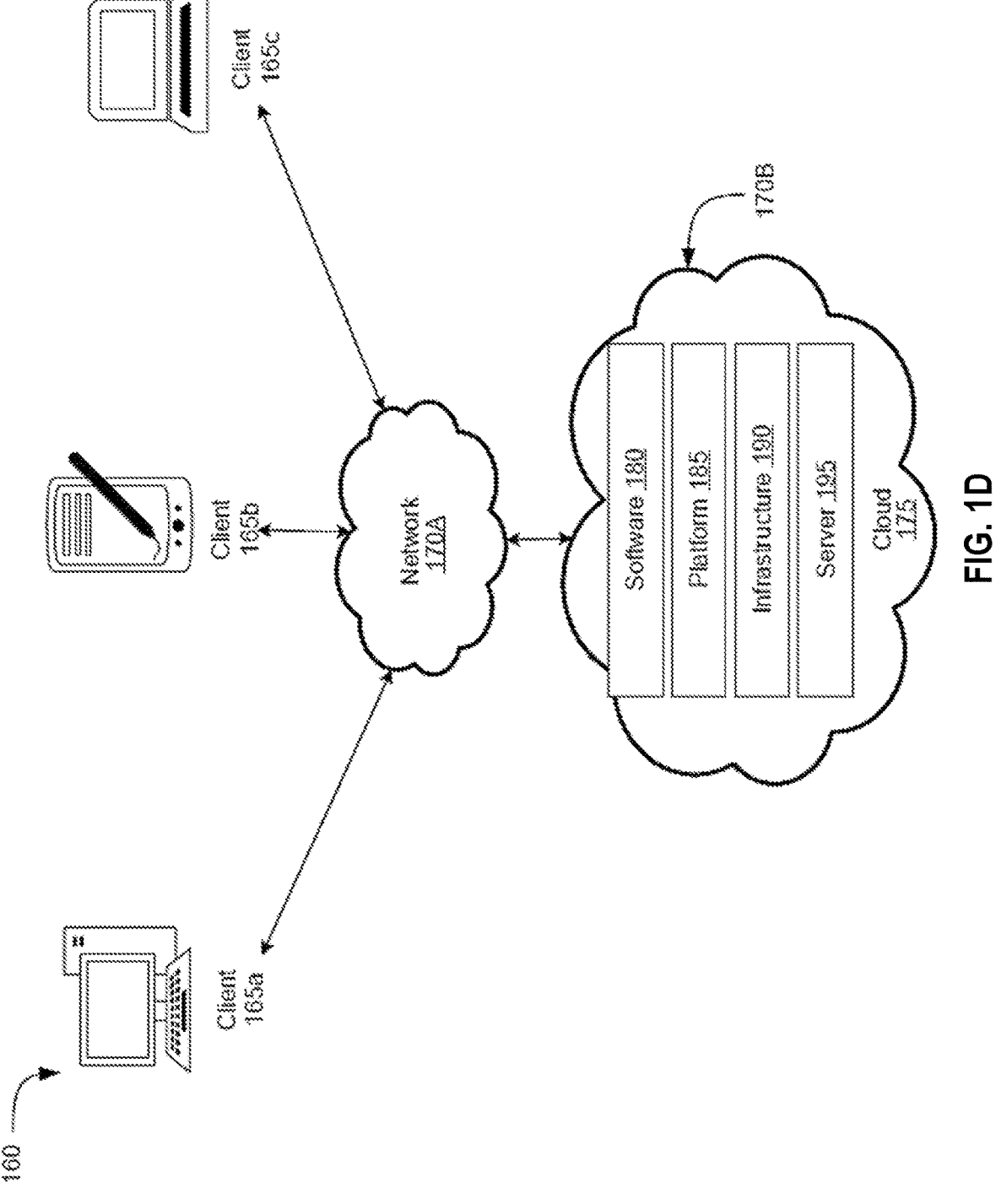
FIG. 1D is a block diagram depicting a computing environment comprising client device in communication with cloud service providers, in accordance with an illustrative embodiment.

Referring to FIG. 1D, a computing environment 160 is depicted. Computing environment 160 may generally be considered implemented as a cloud computing environment, an on-premises ("on-prem") computing environment, or a hybrid computing environment including one or more on-prem computing environments and one or more cloud computing environments. When implemented as a cloud computing environment, also referred as a cloud environment, cloud computing or cloud network, computing environment 160 can provide the delivery of shared services (e.g., computer services) and shared resources (e.g., computer resources) to multiple users. For example, the computing environment 160 can include an environment or system for providing or delivering access to a plurality of shared services and resources to a plurality of users through the internet. The shared resources and services can include, but not limited to, networks, network bandwidth, servers 195, processing, memory, storage, applications, virtual machines, databases, software, hardware, analytics, and intelligence.

In embodiments, the computing environment 160 may provide client 165 with one or more resources provided by a network environment. The computing environment 165 may include one or more clients 165a-165n, in communication with a cloud 175 over one or more networks 170A, 170B. Clients 165 may include, e.g., thick clients, thin clients, and zero clients. The cloud 175 may include back end platforms, e.g., servers 195, storage, server farms or data centers. The clients 165 can be the same as or substantially similar to computer 100 of FIG. 1C.

The users or clients 165 can correspond to a single organization or multiple organizations. For example, the computing environment 160 can include a private cloud serving a single organization (e.g., enterprise cloud). The computing environment 160 can include a community cloud or public cloud serving multiple organizations. In embodiments, the computing environment 160 can include a hybrid cloud that is a combination of a public cloud and a private cloud. For example, the cloud 175 may be public, private, or hybrid. Public clouds 175 may include public servers 195 that are maintained by third parties to the clients 165 or the owners of the clients 165. The servers 195 may be located off-site in remote geographical locations as disclosed above or otherwise. Public clouds 175 may be connected to the servers 195 over a public network 170. Private clouds 175 may include private servers 195 that are physically maintained by clients 165 or owners of clients 165. Private clouds 175 may be connected to the servers 195 over a private network 170. Hybrid clouds 175 may include both the private and public networks 170A, 170B and servers 195.

The cloud 175 may include back end platforms, e.g., servers 195, storage, server farms or data centers. For example, the cloud 175 can include or correspond to a server 195 or system remote from one or more clients 165 to provide third party control over a pool of shared services and resources. The computing environment 160 can provide resource pooling to serve multiple users via clients 165 through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In embodiments, the computing environment 160 can provide on-demand self-service to unilaterally provision computing capabilities (e.g., server time, network storage) across a network for multiple clients 165. The computing environment 160 can provide an elasticity to dynamically scale out or scale in responsive to different demands from one or more clients 165. In some embodiments, the computing environment 160 can include or provide monitoring services to monitor, control and/or generate reports corresponding to the provided shared services and resources.

In some embodiments, the computing environment 160 can include and provide different types of cloud computing services. For example, the computing environment 160 can include Infrastructure as a service (IaaS). The computing environment 160 can include Platform as a service (PaaS). The computing environment 160 can include server-less computing. The computing environment 160 can include Software as a service (SaaS). For example, the cloud 175 may also include a cloud based delivery, e.g. Software as a Service (SaaS) 180, Platform as a Service (PaaS) 185, and Infrastructure as a Service (IaaS) 190. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Washington, RACKSPACE CLOUD provided by Rackspace US, Inc., of San Antonio, Texas, Google Compute Engine provided by Google Inc. of Mountain View, California, or RIGHTSCALE provided by RightScale, Inc., of Santa Barbara, California. PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Washington, Google App Engine provided by Google Inc., and HEROKU provided by Heroku, Inc. of San Francisco, California. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, California, or OFFICE 365 provided by Microsoft Corporation. Examples of SaaS may also include data storage providers, e.g. DROPBOX provided by Dropbox, Inc. of San Francisco, California, Microsoft SKYDRIVE provided by Microsoft Corporation, Google Drive provided by Google Inc., or Apple ICLOUD provided by Apple Inc. of Cupertino, California.

Clients 165 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 165 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 165 may access SaaS resources through the use of web-based user interfaces, provided by a web browser (e.g. GOOGLE CHROME, Microsoft INTERNET EXPLORER, or Mozilla Firefox provided by Mozilla Foundation of Mountain View, California). Clients 165 may also access SaaS resources through smartphone or tablet applications, including, e.g., Salesforce Sales Cloud, or Google Drive app. Clients 165 may also access SaaS resources through the client operating system, including, e.g., Windows file system for DROP-BOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

B. Appliance Architecture

Figure 2:
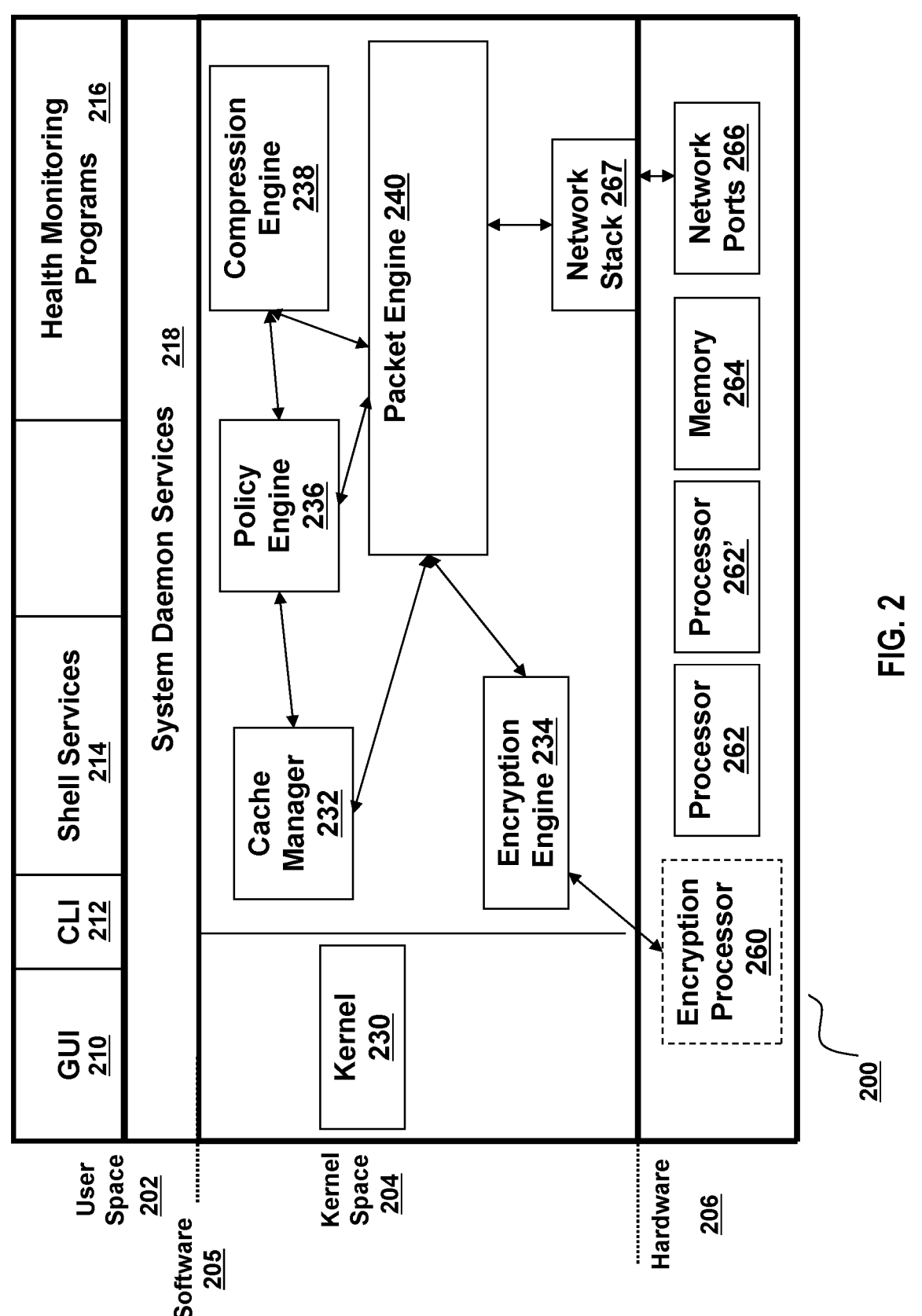
FIG. 2 is a block diagram of an appliance for processing communications between a client and a server, in accordance with an illustrative embodiment.

FIG. 2 shows an example embodiment of appliance 200. As described herein, appliance 200 may be implemented as a server, gateway, router, switch, bridge or other type of computing or network device. As shown in FIG. 2, an embodiment of appliance 200 may include a hardware layer 206 and a software layer 205 divided into a user space 202 and a kernel space 204. Hardware layer 206 provides the hardware elements upon which programs and services within kernel space 204 and user space 202 are executed and allow programs and services within kernel space 204 and user space 202 to communicate data both internally and externally with respect to appliance 200. As shown in FIG. 2, hardware layer 206 may include one or more processing units 262 for executing software programs and services, memory 264 for storing software and data, network ports 266 for transmitting and receiving data over a network, and encryption processor 260 for encrypting and decrypting data such as in relation to Secure Socket Layer (SSL) or Transport Layer Security (TLS) processing of data transmitted and received over the network.

An operating system of appliance 200 allocates, manages, or otherwise segregates the available system memory into kernel space 204 and user space 202. Kernel space 204 is reserved for running kernel 230, including any device drivers, kernel extensions or other kernel related software. As known to those skilled in the art, kernel 230 is the core of the operating system, and provides access, control, and management of resources and hardware-related elements of application 104. Kernel space 204 may also include a number of network services or processes working in conjunction with cache manager 232.

Appliance 200 may include one or more network stacks 267, such as a TCP/IP based stack, for communicating with client(s) 102, server(s) 106, network(s) 104, and/or other appliances 200 or 205. For example, appliance 200 may establish and/or terminate one or more transport layer connections between clients 102 and servers 106. Each network stack 267 may include a buffer 243 for queuing one or more network packets for transmission by appliance 200.

Kernel space 204 may include cache manager 232, packet engine 240, encryption engine 234, policy engine 236 and compression engine 238. In other words, one or more of processes 232, 240, 234, 236 and 238 run in the core address space of the operating system of appliance 200, which may reduce the number of data transactions to and from the memory and/or context switches between kernel mode and user mode, for example since data obtained in kernel mode may not need to be passed or copied to a user process, thread or user level data structure.

Cache manager 232 may duplicate original data stored elsewhere or data previously computed, generated or transmitted to reducing the access time of the data. In some embodiments, the cache memory may be a data object in memory 264 of appliance 200, or may be a physical memory having a faster access time than memory 264.

Policy engine 236 may include a statistical engine or other configuration mechanism to allow a user to identify, specify, define or configure a caching policy and access, control and management of objects, data or content being cached by appliance 200, and define or configure security, network traffic, network access, compression or other functions performed by appliance 200.

Encryption engine 234 may process any security related protocol, such as SSL or TLS. For example, encryption engine 234 may encrypt and decrypt network packets, or any portion thereof, communicated via appliance 200, may setup or establish SSL, TLS or other secure connections, for example between client 102, server 106, and/or other appliances 200 or 205. In some embodiments, encryption engine 234 may use a tunneling protocol to provide a VPN between a client 102 and a server 106. In some embodiments, encryption engine 234 is in communication with encryption processor 260. Compression engine 238 compresses network packets bi-directionally between clients 102 and servers 106 and/or between one or more appliances 200.

Packet engine 240 may manage kernel-level processing of packets received and transmitted by appliance 200 via network stacks 267 to send and receive network packets via network ports 266. Packet engine 240 may operate in conjunction with encryption engine 234, cache manager 232, policy engine 236 and compression engine 238, for example to perform encryption/decryption, traffic management such as request-level content switching and request-level cache redirection, and compression and decompression of data.

User space 202 is a memory area or portion of the operating system used by user mode applications or programs otherwise running in user mode. A user mode application may not access kernel space 204 directly and uses service calls in order to access kernel services. User space 202 may include graphical user interface (GUI) 210, a command line interface (CLI) 212, shell services 214, health monitor 216, and daemon services 218. GUI 210 and CLI 212 enable a system administrator or other user to interact with and control the operation of appliance 200, such as via the operating system of appliance 200. Shell services 214 include the programs, services, tasks, processes or executable instructions to support interaction with appliance 200 by a user via the GUI 210 and/or CLI 212.

Health monitor 216 monitors, checks, reports and ensures that network systems are functioning properly and that users are receiving requested content over a network, for example by monitoring activity of appliance 200. In some embodiments, health monitor 216 intercepts and inspects any network traffic passed via appliance 200. For example, health monitor 216 may interface with one or more of encryption engine 234, cache manager 232, policy engine 236, compression engine 238, packet engine 240, daemon services 218, and shell services 214 to determine a state, status, operating condition, or health of any portion of the appliance 200. Further, health monitor 216 may determine if a program, process, service or task is active and currently running, check status, error or history logs provided by any program, process, service or task to determine any condition, status or error with any portion of appliance 200. Additionally, health monitor 216 may measure and monitor the performance of any application, program, process, service, task or thread executing on appliance 200.

Daemon services 218 are programs that run continuously or in the background and handle periodic service requests received by appliance 200. In some embodiments, a daemon service may forward the requests to other programs or processes, such as another daemon service 218 as appropriate.

As described herein, appliance 200 may relieve servers 106 of much of the processing load caused by repeatedly opening and closing transport layer connections to clients 102 by opening one or more transport layer connections with each server 106 and maintaining these connections to allow repeated data accesses by clients via the Internet (e.g., "connection pooling"). To perform connection pooling, appliance 200 may translate or multiplex communications by modifying sequence numbers and acknowledgment numbers at the transport layer protocol level (e.g., "connection multiplexing"). Appliance 200 may also provide switching or load balancing for communications between the client 102 and server 106.

As described herein, each client 102 may include client agent 120 for establishing and exchanging communications with appliance 200 and/or server 106 via a network 104. Client 102 may have installed and/or execute one or more applications that are in communication with network 104. Client agent 120 may intercept network communications from a network stack used by the one or more applications. For example, client agent 120 may intercept a network communication at any point in a network stack and redirect the network communication to a destination desired, managed or controlled by client agent 120, for example to intercept and redirect a transport layer connection to an IP address and port controlled or managed by client agent 120. Thus, client agent 120 may transparently intercept any protocol layer below the transport layer, such as the network layer, and any protocol layer above the transport layer, such as the session, presentation or application layers. Client agent 120 can interface with the transport layer to secure, optimize, accelerate, route or load-balance any communications provided via any protocol carried by the transport layer.

In some embodiments, client agent 120 is implemented as an Independent Computing Architecture (ICA) client developed by Citrix Systems, Inc. of Fort Lauderdale, FL. Client agent 120 may perform acceleration, streaming, monitoring, and/or other operations. For example, client agent 120 may accelerate streaming an application from a server 106 to a client 102. Client agent 120 may also perform end-point detection/scanning and collect end-point information about client 102 for appliance 200 and/or server 106. Appliance 200 and/or server 106 may use the collected information to determine and provide access, authentication and authorization control of the client's connection to network 104. For example, client agent 120 may identify and determine one or more client-side attributes, such as: the operating system and/or a version of an operating system, a service pack of the operating system, a running service, a running process, a file, presence or versions of various applications of the client, such as antivirus, firewall, security, and/or other software.

Additional details of the implementation and operation of appliance 200 may be as described in U.S. Pat. No. 9,538, 345, issued Jan. 3, 2017 to Citrix Systems, Inc. of Fort Lauderdale, FL, the teachings of which are hereby incorporated herein by reference.

C. Systems and Methods for Detecting Security Threats and Performing Corrective Actions The present disclosure is directed towards systems and methods for detecting/identifying/monitoring potential security threats, performance anomalies, and/or configuration/misconfiguration issues, and/or determining/performing corrective actions in a distributed manner (rather than a centralized manner). For instance, according to the systems and methods described herein, one or more devices (e.g., a first ADC, a second ADC, and/or other devices) can generate data (e.g., metrics, information of a counter, information of events, and/or other types of data) based on a configuration of each device and/or a flow of network traffic, for example. The generated data may be collected and/or analyzed by one or more agents (e.g., agents of the devices), servers, and/or devices. Machine or statistical learning can be performed by using (or based on) the data (e.g., counter information and/or attributes of transactions). In one example, a dataset comprising a subset of data (e.g., si_tot_svr_ttfb, si_tot_svr_ttfb_transactions, and/or other types of data) can be used (e.g., to perform machine and/or statistical learning) for identifying anomalies in a response time of a server. In certain embodiments, another dataset (e.g., a dataset comprising tcp_err_SW_init_pktdrop, dht_ns_tot_max_limit_exceeds, serv_tot_Hits and/or other types of data) may be used to detect and/or identify a transmission control protocol (TCP) window attack, a persistence limit, an improper type of persistence, and/or other anomalous behavior.

In certain embodiments, a controller of the server (or other entities) may store and/or maintain (e.g., store in a cloud and/or database) the data tracked at the devices. The controller may further analyze and/or process the stored data. For instance, the controller can perform/apply infer-ence techniques, such as machine and/or statistical learning approaches, on the stored data over time (e.g., to detect and/or identify security threats). Said inference techniques can be refined, adjusted and/or fine-tuned based on data (e.g., tracked at the devices) that is continuously obtained and/or stored.

In certain embodiments, the data tracked at the device(s) may include information on metrics, transactions, and/or events. The device(s) (e.g., the first device, the second device, the third device and/or other devices) may include or correspond to an ADC, a proxy, a network appliance/node, an intermediary device, a software-defined wide-area network (SD-WAN) device, a gateway (GW) device, and/or other types of devices. The device(s) can be intermediary between a first plurality of client devices and a first plurality of servers. In certain embodiments, a controller of a server may include a processing module. The processing module may process/analyze the data tracked at the device(s), evaluate risk indicators, and/or perform other actions.

In some embodiments, an agent of a device may include or correspond to an edge module (e.g., edge devices distributed over a network). In one example, edge modules can be geographically distributed. In certain embodiments, one or more devices (e.g., ADCs and/or other sources of data) may have a connection (e.g., a wireless or wired connection) with at least one edge module. Via the connection, the edge module(s) and/or the device(s) may upload (e.g., to a server) and/or store (e.g., in a database) data tracked at the device(s). In such an example system (e.g., a distributed system), federated learning and/or decision making can be used to determine corrective actions. Federated learning (also known as collaborative learning) refers to a machine learning technique performed across a plurality of decentralized edge modules holding/storing local data (e.g., data tracked at the devices). Instructions for initiating corrective actions (otherwise referred to as actions) can be configured by the device(s), the agent(s), and/or the server(s). In certain embodiments, instructions and/or actions (or other types of learned information, such as patterns for detecting threats) can be shared across agents.

In certain embodiments, an agent of a device (e.g., a built-in agent and/or an external agent) can export, obtain and/or acquire data tracked at a device. In one example, a device may directly apply and/or perform an action (e.g., a corrective action to address/mitigate anomalous behavior) via a corresponding agent (e.g., an external agent). In one example, a device (e.g., ADC and/or other devices) may have access to (e.g., collect, store, obtain, track, and/or monitor) one or more counters associated with violations performed by a bot. The counter(s) may include bot_viol_black_list_reset_profile, bot_viol_rate_limit_reset_profile, bot_viol_tps_reset_profile, bot_viol_rate_limit_drop_profile, bot_tot_request, and/or other counters. In certain embodiments, an agent may obtain the value of the counter(s) (and/or information associated with the counter(s)) from the device(s), according to a time interval (e.g., obtain values every 30 seconds). One or more agents may monitor and/or analyze the value of the counter(s). In one example, and responsive to monitoring the value of the counter(s), the agent(s) may detect and/or identify a significant variation (e.g., a large increase) in the value of the counter(s). The agent(s) may notify and/or alert the device(s) of such a detection. In one example, if at least 50 (or other values) out of 100 (or other values) bot requests (e.g., requests initiated by a bot) indicate a violation of a rate limit drop profile (e.g., (bot_viol_rate_limit_drop_profile/bot_tot_request)*$100 \geq 50\%$), the agent may detect a significant variation (e.g., a large increase) in the value of the counter (e.g., bot_viol_rate_limit_drop_profile).

The threshold(s) for detecting significant variations (e.g., 50% and/or other percentage values) can be adjusted and/or fine-tuned according to (or by using) the data tracked at the devices over time (e.g., based on trends and/or behavioral patterns of the tracked data). As such, data tracked at a plurality of devices (rather than data from a single device) can be accumulated, combined and/or used (e.g., by the agent(s) and/or server(s)) to further improve the detection and/or identification of possible security threats (e.g., performing cross-tenant learning based on location, applications, and/or users). Although data from a plurality of devices can be combined and/or pooled, a corresponding agent of a device (e.g. a first agent of a first device and/or a second agent of a second device) may use different criteria (e.g., distinct thresholds) to detect significant variation(s) (e.g., anomalous behavior) in the data tracked at the device(s) (e.g., counter information and/or other data).

Figure 3:
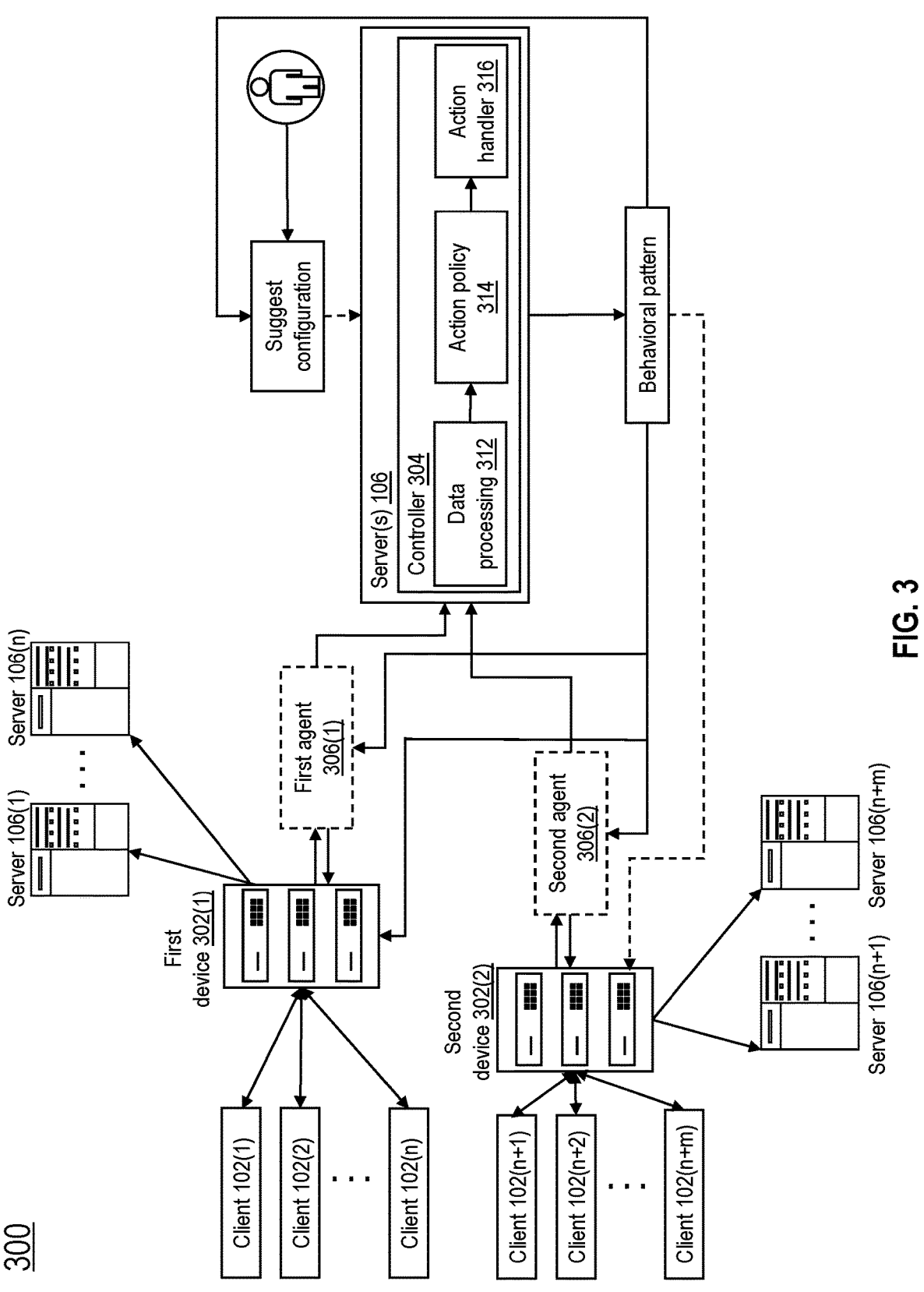
FIGS. 3 and 4 are block diagrams of systems for detecting potential security threats and/or performing corrective actions, in accordance with illustrative embodiments.

In view of the above discussion regarding detecting potential security threats and/or performing corrective actions, a process and/or system for performing said detecting and/or corrective actions, may be beneficial, as further explained in the following passages. Referring to FIG. 3, depicted is a block diagram of one example embodiment of a system 300 for detecting potential security threats and/or performing corrective actions in a distributed manner. The system 300 may include one or more client devices 102 of a user (sometimes referred to as clients 102), one or more devices 302, one or more servers 106, one or more agents 306 and/or other components. The server(s) 106 can include or maintain one or more controllers 304. The controller(s) 304 can include or maintain a data processing module 312, an action policy module 314, an action handler 316, and/or other modules.

Each of the above-mentioned elements or entities is implemented in hardware, or a combination of hardware and software, in one or more embodiments. Each component of the system 300 may be implemented using hardware or a combination of hardware or software detailed above in connection with FIG. 1C. For instance, each of these elements or entities can include any application, program, library, script, task, service, process or any type and form of executable instructions executing on hardware of a client 102, a server 106 and/or a network device 200 in connection with FIGS. 1B-1C, for instance. The hardware includes circuitry such as one or more processors in one or more embodiments.

The system 300 may include one or more clients 102 (or client devices 102), such as one or more mobile devices, tablets, laptops, computers, and/or other clients 102. The client(s) 102 may include or correspond to one or more devices of a consumer of a resource, such as a user. In one example, if the consumer is an individual or user, the client device(s) 102 may comprise a smartphone, a laptop (e.g., at home), a tablet device, and a desktop computer (e.g., at work), that the user may use to access an application resource (e.g., Dropbox service) and/or other resources at various times and/or locations for instance. In an example where the consumer is an organization, such as an enterprise, the consumer can extend over a number of users (e.g., management persons, staff members, IT administrators, and so on) and their associated client(s) 102 or devices (e.g., corporate-issued device, personally-owned devices, and/or registered/approved devices (e.g., in a BYOD program)). Any number of the users may access a service/resource (e.g., salesforce.com, SAP, Microsoft Office 365) from a service/ resource provider, via a corporate account for the service/ resource for instance. In some embodiments, the client device(s) 102 may interact with one or more server(s) 106 directly, or indirectly via a device 302 (e.g., first device 302(1) and/or second device 302(2), and/or other devices intermediary between the client device(s) 102 and the server(s) 106). In certain embodiments, the system 300 may include a first plurality of client devices 102 (e.g., client 102(1) to client 102(n)) and/or a second plurality of client devices 102 (e.g., client 102(n+1) to client 102(n+m)). In some embodiments, the first plurality of client devices 102 may share/communicate traffic (e.g., data packets) and/or transactions with a first plurality of servers 106(1) to server 106(n)). In some embodiments, the second plurality of client devices 102 may share traffic (e.g., data packets) and/or transactions with a second plurality of servers (e.g., server 106(n+1) to server 106(n+m)).

The system 300 may include one or more devices 302 (sometimes referred to as appliance(s) 200, gateway(s) 200, node(s), and/or application delivery controllers), such as a first device 302(1), a second device 302(2), a third device 302, and/or other devices 302. A device 302 may be configured and/or designed to serve as an intermediary between different elements of a computer and/or network environment, such as between client(s) 102, server(s) 106, network(s) 104, and/or other devices 302 (e.g., as discussed above in connection with FIG. 2). In some embodiments, the device 302 may receive/obtain a first request/message (e.g., HTTP GET request and/or other requests) from a client 102 and/or user to access one or more resources from the server 106.

In certain embodiments, one or more devices 302 may receive and/or obtain one or more instructions from a controller 304. Responsive to receiving the instruction(s), an action (e.g., a first action, a second action, a third action and/or other actions) may be initiated (e.g., by an agent 306) at the device(s) 302. For instance, the device(s) 302 and/or the agent(s) 306 may perform an action to mitigate and/or address a detected security threat. In one example, each device 302 (e.g., first device 302(1) and/or second device 302(2)) and corresponding agent 306 (e.g., first agent 306(1) and/or second agent 306(2)) may perform separate, different and/or distinct actions. For example, a first device 302(1) and first agent 306(1) may perform separate/different actions from a second device 302(2) and a second agent 306(2). In another example, each device 302 (e.g., first device 302(1) and/or second device 302(2)) and corresponding agent 306 (e.g., first agent 306(1) and/or second agent 306(2)) may perform same or corresponding actions. For instance, a first device 302(1) and first agent 306(1) may perform same actions as a second device 302(2) and a second agent 306(2). In some embodiments, an action may include or correspond to a corrective action to address an anomalous behavior (e.g., a possible security threat). The anomalous behavior may be detected in data tracked at the device(s) 302 (e.g., tracked by an agent 306).

In some embodiments, the device 302 may be located at any one of various points or in any of various communication paths, for example between two networks 104, within a computing and/or network environment 100. In other embodiments, the device 302 may be located on a network 104. One or more devices 302 may communicate with one another and/or work in conjunction to, for example, accelerate, protect and/or secure network traffic between clients 102 and servers 106 and/or provide load balancing of servers 106 to process requests from clients 102. In some embodiments, the one or more devices 302 may act as a proxy or access server to provide access to the one or more servers

106, provide security and/or act as a firewall between the client 102 and the server 106, and/or provide a secure VPN connection from the client 102 to the server 106, such as a SSL VPN connection and/or provide encryption and decryption operations.

The system 300 may include one or more agents 306 (e.g., first agent 306(1), second agent 306(2), and/or other agents). The agent(s) 306 may provide, send, and/or transmit one or more datasets (e.g., first dataset, second datasets, and/or other datasets) to at least one controller 304 executing on at least one server 106. In one example, the agent(s) 306 may determine a subset and/or portion of data (from the data tracked at the device 302) to be sent to the controller(s) 304 (e.g., to improve computational efficiency/cost). The agent(s) 306 may determine the subset and/or portion of data according to certain criteria (e.g., whether the subset of data exceeds a certain threshold). In some embodiments, the agent(s) 306 may be integrated with at least one device 302. In certain embodiments, the agent(s) 306 can be adjacent and/or external to (e.g., in communication with) at least one device 302. In some embodiments, a particular agent (e.g., a first agent 306(1)) may be associated with (or correspond to) a particular device (e.g., a first device 302(1)).

In some embodiments, the agent(s) 306 may be configured to track and/or monitor data (e.g., datasets, such as a first dataset and/or second dataset) at a corresponding device 302. For instance, the agent(s) 306 can be configured to track and/or monitor traffic and/or transactions between a plurality of client devices 102 (e.g., a second plurality of client devices 102 and/or first plurality of client devices 102) and a plurality of servers 106 (e.g., a second plurality of servers 106 and/or first plurality of servers 106). In one example, the agent(s) 306 can be configured to track and/or monitor information and/or events at a corresponding device 302 (e.g., a first device 302(1) and/or a second device 302(2)). In certain embodiments, the agent(s) 306 can be configured to initiate and/or perform an action (e.g., a corrective action) on at least one device 302 (e.g., according to data tracked at a device 302).

The system 300 may include one or more servers 106. The one or more servers 106 may include or correspond to a first plurality of servers 106 (e.g., server 106(1) to server 106(n)), a second plurality of servers 106 (e.g., server 106(n+1) to server 106(n+m)), a third plurality of servers 106, and/or other pluralities of servers 106. The one or more servers 106 may include at least one server 106 in which a controller 304 can be executed. One or more of the server(s) 106 (e.g., a back-end server supporting HTTPS messages or transactions, and/or other servers 106) may be configured and/or designed to host one or more resources and/or other services (e.g., application resources, as a web application, SaaS application, PaaS application, and/or a remote-hosted network application). The server 106 may be configured and/or designed to provision and/or execute the one or more resources and/or services (or provision user interfaces 306 through which to access the resource(s) and/or service(s)) to one or more clients 102 (e.g., one or more mobile devices, tablets, desktops, and/or other clients 102) of a consumer or other entity (e.g., an organization or a user of the client device 102) via one or more networks 104. For example, the client 102 may establish one or more sessions or connections (e.g., secured or otherwise, such as a SSL virtual private network connection) with the server(s) 106 to access a service/resource (e.g., through a user interface 306), such as an application resource (e.g., PaaS resource and/or other resources). In another example, the server(s) 106 may receive/obtain a request (e.g., such as a HTTP request) from at least one device 302 and/or other devices (e.g., client devices 102) to access, use and/or provision one or more resources (or establish the connections to access the one or more resources).

To provide a service/resource, the server(s) 106 may execute, provide, provision, and/or host one or more network application(s). In some embodiments, a service/resource may be referred to interchangeably with an application, application resource or network application. A network application can for instance include a remote-hosted application, a remote-hosted desktop, a web application or a software-as-a-service (SaaS) application. A remote-hosted desktop may be a virtual desktop hosted on the server 106 which is accessed by or remotely provisioned to a client 102. In some embodiments, the delivery of a remote-hosted desktop may be via a session and/or connection based on High-Definition User Experience (HDX) or Independent Computing Architecture (ICA) display remoting protocol, or Remote Desktop Protocol (RDP). A remote-hosted application may include/correspond to an application service that can be delivered via a HDX-based, ICA-based, RDP-based, etc., session and/or connection. In some embodiments, a remote-hosted application may be an application which is installed on/in the remote-hosted desktop environment and is therefore accessible within the remote-hosted desktop. A SaaS application can be a centrally-hosted application which is typically accessible on a subscription basis. In some embodiments, the SaaS applications may include web-based applications. In other embodiments, the SaaS applications may correspond to remote-hosted applications and, therefore, can be delivered in HDX/ICA/RDP-based sessions and/or connections. SaaS applications and/or web applications may include for instance salesforce.com, SAP, Microsoft Office 365, Dropbox or Gmail service, Amazon web services, and so on.

In some embodiments, the server(s) can be part of a cloud or datacenter for instance. The server(s) 106 may include any embodiment of volatile memory 122 or non-volatile memory 128 (discussed in FIG. 1C for example) which may store files, data and/or content of the service. The server(s) 106 may communicate with other various components of the system 300 in FIG. 3 via a communications interface 118 for instance. Hence, the server(s) 106 may be similar in some aspects to the computer 101 described with reference to FIG. 1C.

In some embodiments, at least one server 106 of system 300 may include or maintain or have access to at least one controller 304. In certain embodiments, the server(s) 106 may be integrated with the controller(s) 304. In certain embodiments, the controller(s) 304 can be adjacent and/or external to (e.g., in communication with) the at least one server 106. In some embodiments, the controller(s) 304 may include a memory device (not depicted) that is configured to store machine-readable media. The machine-readable media can be readable by a processor (not depicted)) in order to execute the programs stored therein. The memory device (e.g., memory, memory unit, storage device) may include one or more devices (e.g., RAM, ROM, Flash memory, hard disk storage) for storing data and/or machine-readable media for completing or facilitating the various processes, layers and modules (e.g., data processing module 312, action policy module 314, and/or action handler module 316) described in the present disclosure. The memory device may be communicatively coupled to a processor to provide computer code, machine-readable media, or instructions for executing at least some of the processes described herein. Moreover, the memory device may be or include tangible, non-transient volatile memory or non-volatile memory. Accordingly, the memory device may include database components, object code components, script components, or any other type of information structure for supporting the various activities and information structures described herein.

In certain embodiments, the controller(s) 304 may include or maintain or have access to one or more modules (e.g., data processing module 312, action policy module 314, and/or action handler module 316). The one or more modules may comprise a data processing module 312, an action policy module 314, and/or an action handler module 316. The data processing module 312 may be configured to obtain (e.g., from at least one agent 306) and/or identify critical events (e.g., possible security threats) that trigger and/or initiate an action on the device(s) 302. The data processing module 312 may identify and/or detect said critical events from data tracked at the device(s) 302. The action policy module 314 may receive and/or obtain data associated with an identified critical event from the data processing module 312 (and/or other modules). The action policy module 314 may config-ure an instruction for initiating an action at the device(s) 302. In some embodiments, the action handler module 316 may be configured to communicate with the agent(s) 306 and/or the device(s) 302 to perform an action at the device(s) 302 (e.g., send an alert notification to user).

In some embodiments, the controller(s) 304 may be configured and/or designed to receive, obtain and/or acquire a first dataset from a first agent 306(1) of a first device 302(1) (e.g., a first ADC, a first SDWAN device, and/or a first GW device). The first dataset may comprise a subset of data (e.g., metrics, counter information, and/or event infor-mation) tracked at the first device 302(1) and available to the first agent 306(1). In certain embodiments, the controller(s) 304 may be configured and/or designed to receive, obtain and/or acquire a second dataset from a second agent 306(2) of a second device 302(2). The second dataset may comprise a subset of data tracked at the second device 302(2) and available to the second agent 306(2).

In some embodiments, the controller(s) 304 may be configured and/or designed to send, transmit, provide, and/or communicate an instruction (e.g., for initiating an action at a device 302) to at least one the first device 302(1), the second device 302(2), a third device 302, and/or other devices 302. The controller(s) 304 may determine to send/transmit the instruction(s) according to the first dataset and/or the second dataset. For example, responsive to receiving/storing/accumulating the datasets, the controller(s) 304 may analyze and/or process the first dataset and/or the second dataset. If the controller(s) 304 determine that at least one dataset includes data indicating a possible security threat (or other anomalous behavior), the controller(s) 304 may send the instruction(s) to at least one device 302. In one example, the controller(s) 304 may send the instruction(s) to a first device 302(1) upon detecting a possible security threat (or other anomalous behavior) in the first dataset. In yet another example, the controller(s) 304 may send the instruction(s) to a second device 302(2) upon detecting a possible security threat (or other anomalous behavior) in the second dataset.

Figure 4:
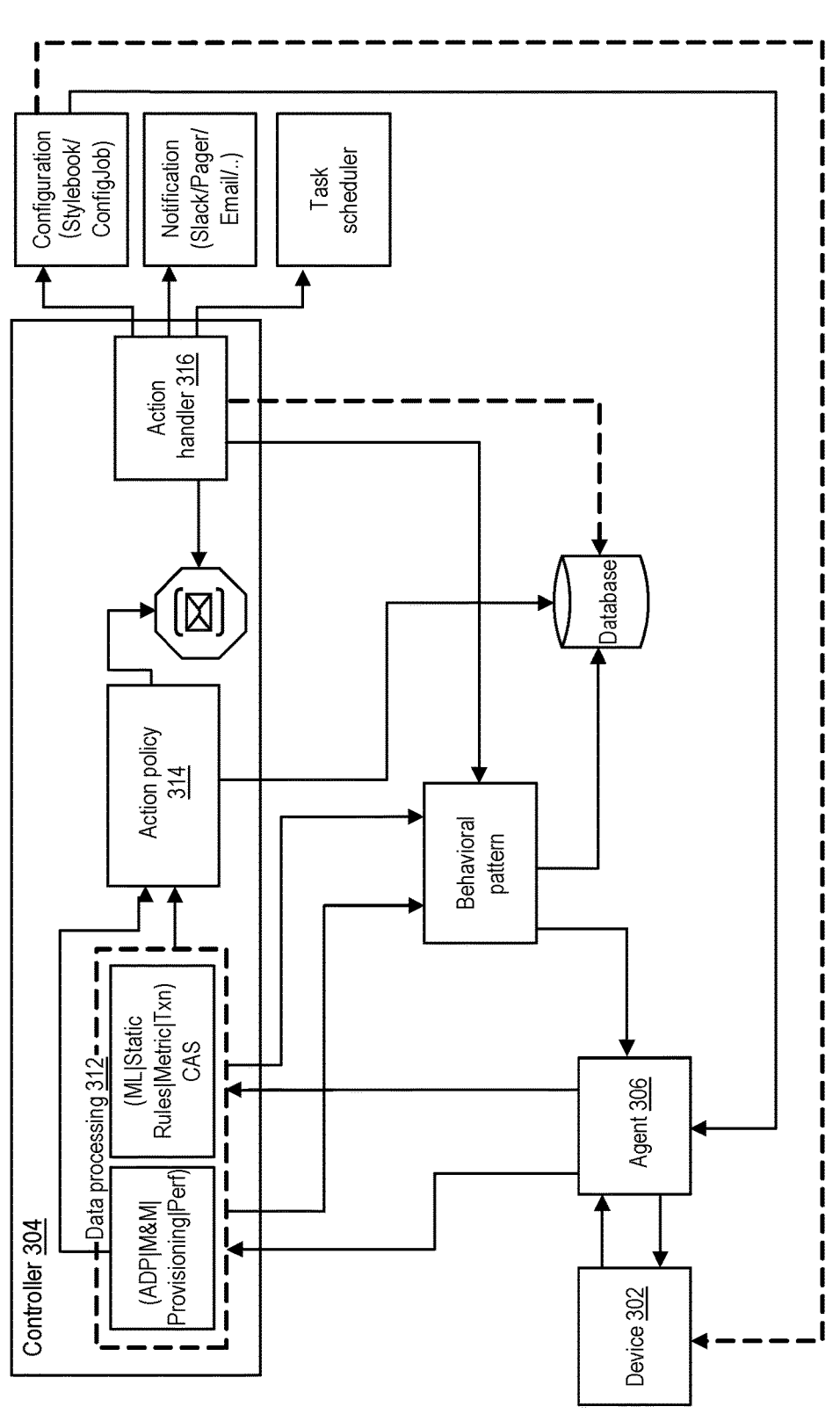

Referring now to FIG. 4, depicted is a block diagram of an example embodiment of a system 400 for sending and/or configuring instructions to perform actions (e.g., corrective actions) based on (or according to) data tracked at a plurality of devices. In FIG. 4, a device 302 (e.g., a source of data) may generate and/or provide a dataset (e.g., a set of attri-butes and/or values tracked at the device 302). The dataset may be used to monitor the performance of one or more components of the system 400, and/or to detect vulnerabili-ties, violations, and/or critical events in the system 400 (e.g., possible security threats). A controller 304 executing on a server of the system 400 may use the dataset to determine and/or configure one or more instructions for initiating actions (e.g., corrective and/or preventive actions) on one or more device(s) 302 of the system 400.

In one example, an attack associated with a bot can be detected and/or monitored according to a list of violations and/or attributes tracked at the device 302 (e.g., similarly for a web application firewall (WAF), GW, secure internet access (SIA), and/or others). The list of violations and/or attributes (or other data) may be collected, processed and/or monitored over a period of time by a closed-loop action pipeline (e.g., a pipeline comprising a device 302 and/or an agent 306). One or more components of the system 400 may configure and/or perform at least one corrective action based on knowledge of the violations and/or attributes (e.g., by comparing values of the violations and/or attributes with at least one threshold for detecting a security breach). In certain embodiments, the data tracked at the device(s) (e.g., violations, attributes and/or other data) may be analyzed and/or processed by using time-series techniques (e.g., machine learning and/or statistical learning), to identify anomalous patterns and/or outliers in the data (e.g., possible security threats or breaches). The analysis (e.g., machine and/or statistical learning) can include and/or use additional information (for example, a location of the device 302, an application type, a traffic pattern, and/or other information) to adjust and/or fine-tune the corrective action(s). Outcomes from said learning process can be shared with one or more agents 306 of the system 400, to enable localized (e.g., at the device 302 and/or agent 306) decision-making of corrective actions. As such, outcomes and/or results of a global learn-ing process (e.g., a process that uses data of one or more devices 302) can be shared with (or provided to) the agent(s) 306 for local usage with a corresponding device 302.

In another example embodiment, a threshold for a maxi-mum CPU level of a TCP optimization may range from 75% to 80% (e.g., if using a load balancing technique, such as SRCIPDESTIPHASH). A system can learn the percentage range (e.g., 75% to 80%, or other percentages) by perform-ing global monitoring of canary deployments, given that certain load balancing techniques (e.g., SRCIPDESTI-PHASH) can tolerate an extended usage of the CPU. In such an example embodiment, an agent 306 may monitor and/or track data at a device 302 (e.g., attributes). Furthermore, the agent 306 may use the monitored/tracked data to perform local actions (e.g., corrective actions) in the corresponding device 302. In one example, the agent 306 may send and/or provide meta-events (e.g., and/or the data tracked at the device 302) to a controller 304 of the server 106, for example. Therefore, the example embodiment may describe a process for defining and/or deploying applications for generating meta-events. The defined and/or deployed appli-cations can run on one or more agents 306 (e.g., with data/history depth that can be locally handled by the agent(s) 306 at the edge), rather than running solely in a CAS DP, application delivery management (ADM)/application deliv-ery controller (ADC) services, and/or centralized cloud components. Coupled with simplified actions deployed via the device 302, the example embodiment can describe a local loop evaluation, policy and/or action pipeline.

In one example embodiment, the agent 306 may inspect and/or analyze the data tracked at the corresponding device 302. Responsive to inspecting and/or analyzing the data, the agent 306 may send, transmit and/or provide at least a portion (e.g., a subset) of the data to the controller 304 of the server 106 (e.g., to improve computational efficiency/cost). If the controller 304 determines (e.g., based on at least the portion of the data) that a threshold for detecting significant variations in the data (e.g., for detecting possible threats) is met or exceeded, additional data can be provided to the controller 304 (e.g., provided by the agent(s) 306). As such, telemetry capabilities can be enabled and/or activated at the edge (e.g., in the device(s) 302 and/or the agent(s) 306), to send at least a (e.g., selectively determined) portion of the data to the controller 304 (rather than sending the entire data).

Figure 6:
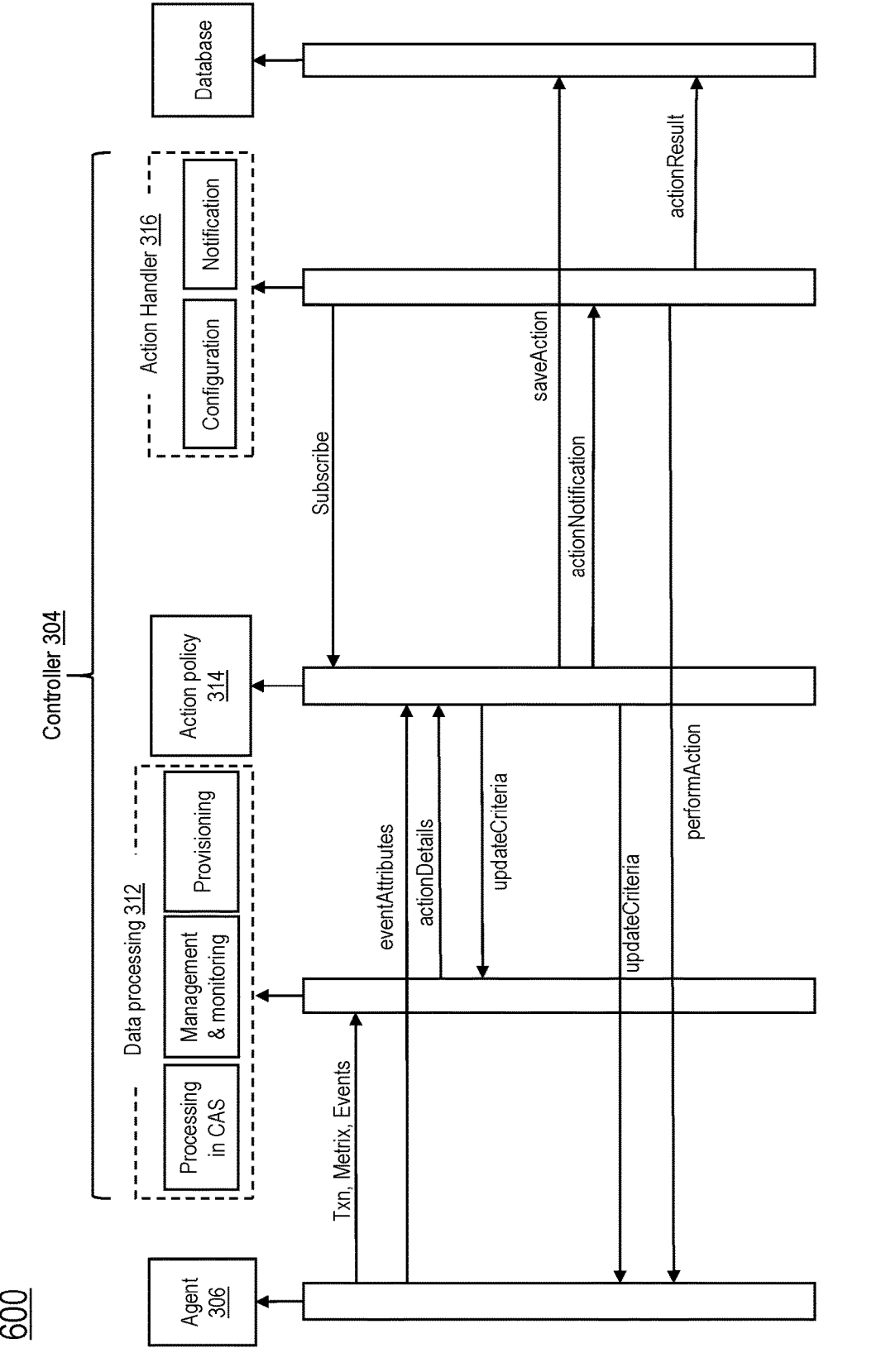
FIG. 6 is a communication diagram of a process for sending and/or configuring instructions to perform corrective actions, in accordance with an illustrative embodiment.

Referring now to FIGS. 5-6, depicted are flow and communication diagrams of example embodiments of a process for sending and/or configuring instructions to perform actions (e.g., corrective actions) based on (or according to) data tracked at a plurality of devices. As discussed herein, one or more agents 306 can manage (or otherwise interact with) one or more devices 302. For instance, the agent(s) 306 may monitor, track, and/or obtain datasets comprising data (e.g., traffic flow, metrics of traffic or transactions, information/events logged at the device 302, and/or other data) associated with the device(s) 302. In one example, the agent(s) 306 may obtain and/or acquire the datasets from the device(s) 302. Responsive to obtaining the datasets, the agent(s) 306 may analyze and/or process the datasets to identify critical issues (e.g., high availability (HA) failover and/or other issues).

In certain embodiments, the agent(s) 306 and/or device(s) 302 may provide the datasets to a controller 304 of a server 106 for further processing. In one example, the agent(s) 306 and/or device(s) 302 may provide the datasets to the controller 304 at regular time intervals (e.g., once per minute). Responsive to receiving the datasets, the controller 304 may process, aggregate and/or combine datasets from a plurality of devices 302. According to the received datasets, the controller 304 may determine, configure and/or send an instruction for initiating an action (e.g., a corrective action) in at least one device 302. In certain embodiments, the controller 304 may determine, configure and/or send the instruction if a variation, change, and/or deviation in value(s) of the datasets meets or exceeds one or more thresholds (or other criteria) for detecting significant variations (e.g., possible security threats). For instance, if one or more values of the dataset (e.g., one or more metrics of traffic and/or other data tracked at the devices(s) 302) include a persistent and significant deviation from a baseline, the controller 304 may determine, configure and/or send the instruction for initiating an action. As such, responsive to detecting a potential threat, the controller 304 may send an instruction to one or more device(s) 302 to perform a preventative and/or corrective action (e.g., un-bind a server 106 and/or other actions).

According to FIGS. 5-6, the controller 304 executing on at least one server 106 may include one or more modules. The one or more modules may comprise a data processing module 312, an action policy module 314, and/or an action handler module 316. The data processing module 312 may be configured to obtain (e.g., from at least one agent 306) and/or identify critical events (e.g., possible security threats) that trigger and/or initiate an action on the device(s) 302. The action policy module 314 may receive and/or obtain data from the data processing module 312 (and/or other modules). The data from the data processing module 312 may include data associated with an identified critical event (e.g., violation, threshold breach, critical events, events, and/or other data). The action policy module 314 may configure an instruction for initiating an action on the device(s) 302. In some embodiments, the action handler module 316 may be configured to communicate with the agent(s) 306 and/or the device(s) 302 to perform an action at the device(s) 302 (e.g., send an alert notification to user). An action can be stored for further processing (e.g., to identify patterns and/or for auditing/historical purposes). In certain embodiments, a lightweight data processing mechanism (e.g., DPLite and/or other mechanisms) can run within an agent 306 (e.g., to perform an action at the edge)

Figure 7:
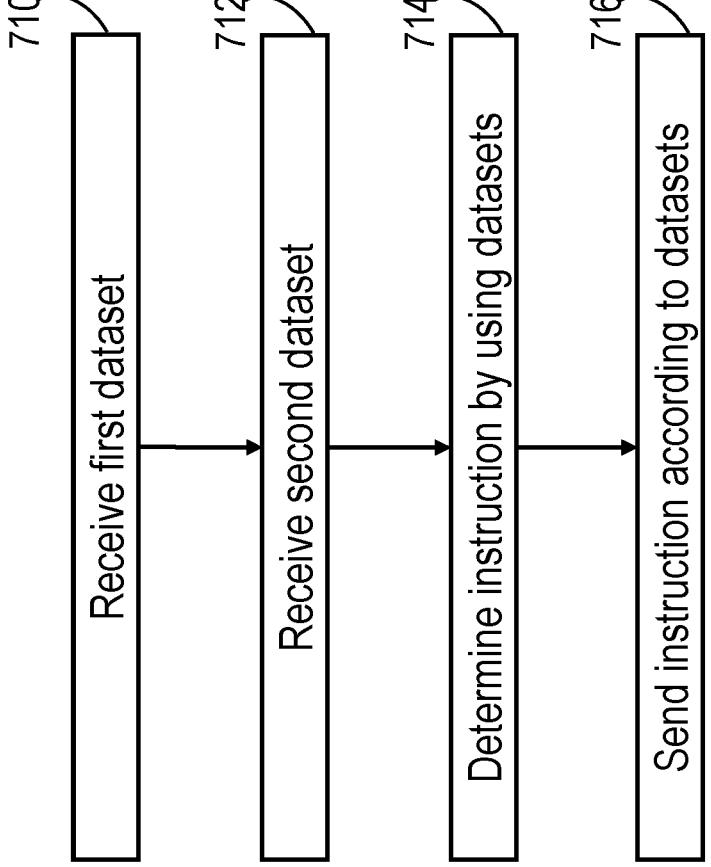
FIG. 7 is a flow diagram of an example method for detecting potential security threats and/or performing corrective actions, in accordance with an illustrative embodiment.

Referring to FIG. 7, depicted is a flow diagram of one embodiment of a method for detecting potential security threats and/or performing corrective actions in a distributed manner. The functionalities of the method may be implemented using, or performed by, any one or more of the components detailed herein in connection with FIGS. 1-6. In brief overview, a controller 304 may receive a first dataset (710). The controller 304 may receive a second dataset (712). The controller 304 may determine an instruction by using a first dataset and/or a second dataset (714). The controller 304 may send the instruction according to the first dataset and/or the second dataset (716).

Referring now to operation (710), and in some embodiments, at least one controller 304 may receive and/or obtain a first dataset from a first agent 306(1) of a first device 302(1) (e.g., a first ADC, first SDWAN device, and/or first GW device). The controller(s) 304 may be configured to execute on at least one server 106. The first agent 306(1) may execute on the first device 302(1) and/or be external to the first device 302(1). The first device 302(1) may be intermediary between a first plurality of client devices 102 and a first plurality of servers 106. The first dataset may include or comprise a subset of data (e.g., metrics, counter information, event information and/or other data). The subset of data can be tracked at the first device 302(1). In certain embodiments, the subset of data may be available to the first agent 306(1). In one example, a certain event (such as meeting a local threshold/criteria) may cause the subset of data to be available to the first agent 306(1). In some embodiments, the first dataset may comprise information and/or events logged at the first device 302(1). In one example, the first dataset may comprise metrics of traffic (e.g., data packets) and/or transactions between the first plurality of client devices 102 and the first plurality of servers 106. In certain embodiments, the first dataset may comprise the subset of the data tracked at the first device 302(1) that is determined to be sent to the controller(s) 304. The first agent 306(1) may determine the subset of the data (e.g., tracked at the first device 302(1)) to be sent to the controller(s) 304 according to a criteria. For instance, if a subset of the data includes a significant variation and/or deviation from a baseline (e.g., exceeding a certain threshold), the first agent 306(1) may determine to send the subset of the data to the controller(s) 304. The significant variation/ deviation may correspond to an anomalous behavior of the dataset(s) (e.g., a potential security threat).

Referring now to operation (712), and in some embodiments, the controller(s) 304 executing on at least one server 106 may receive and/or obtain a second dataset from a second agent 306(2) of a second device 302(2) (e.g., a second ADC, second SDWAN device, and/or second GW device). The second agent 306(2) may execute on the second device 302(2) and/or be external to the second device 302(2). The second device 302(2) may be intermediary between a second plurality of client devices 102 and a second plurality of servers 106. The second dataset may include or comprise a subset of data. The subset of data can be tracked at the second device 302(2). In certain embodiments, the subset of data may be available to the second agent 306(2). In one example, a certain event (such as meeting a local threshold/criteria) may cause the subset of data to be available to the second agent 306(2). In some embodiments, the second dataset may comprise information and/or events logged at the second device 302(2). In one example, the second dataset may comprise metrics of traffic or transactions between the second plurality of client devices 102 and the second plurality of servers 106. In certain embodiments, the second dataset may comprise the subset of the data tracked at the second device 302(2) that is determined to be sent to the controller(s) 304. The second agent 306(2) may determine the subset of the data (e.g., tracked at the second device 302(2)) to be sent to the controller(s) 304 according to a criteria (e.g. exceeding or meeting a threshold). In certain embodiments, the controller(s) 304 may receive and/or obtain the first dataset and/or the second dataset over a defined time duration (e.g., every 30 seconds). The controller(s) 304 may store and/or maintain the first dataset and/or the second dataset (e.g., store and/or maintain in cloud storage, a database, and/or other types of storage/memory). In some embodiments, the controller(s) 304 may determine the instruction(s) by using the stored first dataset and/or the stored second dataset.

Referring now to operation (714), and in some embodiments, the controller(s) 304 executing on at least one server 106 may determine at least one instruction by using the first dataset and/or the second dataset. For example, the controller(s) 304 may determine the instruction(s) by using a portion of the first dataset and/or the second dataset. The portion of the first dataset and/or the second dataset may correspond to (or be associated with) a specific segment (e.g., locations, users and/or applications) of devices 302 (e.g., a segment of ADCs) and/or applications. In some embodiments, the third device 302 may correspond to the specific segment of devices 302 and/or applications. The third device 302 can be intermediary between a third plurality of client devices 102 and a third plurality of servers 106. In certain embodiments, the instruction(s) may initiate a first action on the first device 302(1) and/or the second device 302(2). The first action may be separate from or in addition to a second action initiated by the first agent 306(1) on the first device 302(1). In certain embodiments, the first action may be separate from or in addition to a second action initiated by the second agent 306(2) on the second device 302(2). The second action can be initiated according to the data tracked at the first device 302(1) and/or the second device 302(2).

Referring now to operation (716), and in some embodiments, the controller(s) 304 executing on at least one server 106 may send, transmit, provide, and/or communicate the instruction(s) to at least one device 302. For example, the controller(s) 304 may send and/or transmit the instruction(s) to the first device 302(1), the second device 302(2), the third device 302, and/or other devices 302. In certain embodiments, the controller(s) 304 may send and/or transmit the instruction(s) according to (or based on) the first dataset and/or the second dataset. In one example, the controller(s) 304 may send and/or transmit the instruction(s) via a corresponding agent 306. For instance, the controller(s) 304 may send the instruction(s) to the first device 302(1) via the first agent 306(1). In another example, the controller(s) 304 may send the instruction(s) to the second device 302(2) via the second agent 306(2).

In certain embodiments, the controller(s) 304 may perform machine learning and/or statistical learning/analysis using the first dataset and/or the second dataset. In one example, machine and/or statistical learning can be performed on the first dataset and/or the second dataset to identify and/or detect anomalies in at least one of the datasets (e.g., anomalies in a response time of a server 106). Said machine and/or statistical learning can be refined, adjusted and/or fine-tuned based on the datasets (e.g., the data tracked at the devices 302). In some embodiments, the machine and/or statistical learning may include and/or use additional information (for example, a location of the device 302, an application type, a traffic pattern, and/or other information) to adjust and/or fine-tune the detection of anomalous behavior in the dataset(s). In certain embodiments, and according to the machine and/or statistical learning, the controller(s) 304 may send a criteria and/or an update to the first agent 306(1) to control sending of an additional dataset of the first device 302(1) to the controller(s) 304.

Various elements, which are described herein in the context of one or more embodiments, may be provided separately or in any suitable subcombination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, USB Flash memory, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

We claim:

1. A method comprising:
receiving, by a controller executing on at least one server, a first dataset from a first agent of a first device intermediary between a first plurality of client devices and a first plurality of servers, the first dataset comprising a subset of data tracked at the first device and available to the first agent;
receiving, by the controller, a second dataset from a second agent of a second device intermediary between a second plurality of client devices and a second plurality of servers, the second plurality of client devices and the second plurality of servers being distinct from the first plurality of client devices and the first plurality of servers, the second dataset comprising a subset of data tracked at the second device and available to the second agent;
identifying, by the controller, a security threat indicated in the first data set or the second data set;
sending, a communication to the first device and the second device, the communication comprising an instruction to mitigate the security threat;
initiating a first action on the first device to mitigate the security threat based on a type of the first device; and
initiating a second action on the second device to mitigate the security threat based on a type of the second device;
wherein the type of the first device is different than the type of the second device and the first action on the first device is different than the second action on the second device.

2. The method of claim 1, wherein the first dataset comprises metrics of traffic or transactions between the first plurality of client devices and the first plurality of servers.

3. The method of claim 1, wherein the first dataset comprises information or events logged at the first device.

4. The method of claim 1, wherein the first dataset comprises the subset of the data tracked at the first device that is determined by the first agent according to a criteria, to send to the controller.

5. The method of claim 1, comprising:
determining, by the controller, the instruction by using a portion of the first dataset and the second dataset that correspond to a specific segment of devices or applications.

6. The method of claim 5, wherein the third device corresponds to the specific segment of devices or applications, and is intermediary between a third plurality of client devices and a third plurality of servers.

7. The method of claim 1, comprising:
receiving, by the controller, the first dataset and the second dataset over a defined time duration;
storing, by the controller, the first dataset and the second dataset; and
determining, by the controller, the instruction using the stored first dataset and the stored second dataset.

8. The method of claim 1, comprising:
performing, by the controller, machine or statistical learning using the first dataset and the second dataset.

9. The method of claim 8, comprising:
sending, by the controller according to the machine or statistical learning, a criteria or an update to the first agent to control sending of an additional dataset of the first device to the controller.

10. A system comprising:
at least one processor and a transceiver configured to:
receive a first dataset from a first agent of a first device intermediary between a first plurality of client devices and a first plurality of servers, the first dataset comprising a subset of data tracked at the first device and available to the first agent;
receive a second dataset from a second agent of a second device intermediary between a second plurality of client devices and a second plurality of servers, the second plurality of client devices and the second plurality of servers being distinct from the first plurality of client devices and the first plurality of servers, the second dataset comprising a subset of data tracked at the second device and available to the second agent;
identify a security threat indicated in the first data set or the second data set;
send a communication to the first device and the second device, the communication comprising an instruction to mitigate the security threat;
initiate a first action on the first device to mitigate the security threat based on a type of the first device; and
initiate a second action on the second device to mitigate the security threat based on a type of the second device;
wherein the type of the first device is different than the type of the second device and the first action on the first device is different than the second action on the second device.

11. The system of claim 10, wherein the first dataset comprises metrics of traffic or transactions between the first plurality of client devices and the first plurality of servers.

12. The system of claim 10, wherein the first dataset comprises information or events logged at the first device.

13. The system of claim 10, wherein the first dataset comprises the subset of the data tracked at the first device that is determined by the agent according to a criteria, to send to the controller.

14. The system of claim 10, wherein the at least one processor is further configured to:
determine the instruction by using a portion of the first dataset and the second dataset that corresponds to a specific segment of devices or applications.

15. The system of claim 14, wherein the third device corresponds to the specific segment of devices or applications, and is intermediary between a third plurality of client devices and a third plurality of servers.

16. The system of claim 10, wherein the at least one processor is further configured to:
receive, via the transceiver, the first dataset and the second dataset over a defined time duration;
store the first dataset and the second dataset; and
determine the instruction using the stored first dataset and the stored second dataset.

17. The system of claim 10, wherein the at least one processor is further configured to:
perform machine or statistical learning using the first dataset and the second dataset; and send, via the transceiver according to the machine or statistical learning, a criteria or an update to the first agent to control sending of an additional dataset of the first device to the system.

18. A non-transitory computer-readable medium storing instructions that, when executed by at least one processor, cause the at least one processor to:

receive, via a transceiver, a first dataset from a first agent of a first device intermediary between a first plurality of client devices and a first plurality of servers, the first dataset comprising a subset of data tracked at the first device and available to the first agent;

receive, via the transceiver, a second dataset from a second agent of a second device intermediary between a second plurality of client devices and a second plurality of servers, the second plurality of device devices and the second plurality of servers being distinct from the first plurality of client devices and the first plurality of servers, the second dataset comprising a subset of data tracked at the second device and available to the second agent; and identify a security threat indicated in the first data set or the second data set;

send, via the transmitter, a communication to the first device and the second device, the communication comprising an instruction to mitigate the security threat;

initiate a first action on the first device to mitigate the security threat based on a type of the first device; and initiate a second action on the second device to mitigate the security threat based on a type of the second device;

wherein the type of the first device is different than the type of the second device and the first action on the first device is different than the second action on the second device.

* * * * *